US009661409B2

(12) United States Patent
Leach et al.

(10) Patent No.: US 9,661,409 B2
(45) Date of Patent: May 23, 2017

(54) PRESENTATION SOUND BOX

(71) Applicant: HL Packaging Group, Hong Kong (CN)

(72) Inventors: Miles R. Leach, Hong Kong (CN); Eliot T. Cargile, Hong Kong (CN)

(73) Assignee: HL PACKAGING GROUP, Hong Kong (CN)

(*) Notice: Subject to any disclaimer, the term of this patent is extended or adjusted under 35 U.S.C. 154(b) by 0 days.

(21) Appl. No.: 14/738,246

(22) Filed: Jun. 12, 2015

(65) Prior Publication Data

US 2015/0363159 A1 Dec. 17, 2015

Related U.S. Application Data

(60) Provisional application No. 62/011,247, filed on Jun. 12, 2014.

(51) Int. Cl.
*G06F 3/16* (2006.01)
*H04R 1/02* (2006.01)

(52) U.S. Cl.
CPC .................................... *H04R 1/028* (2013.01)

(58) Field of Classification Search
CPC .......... G06F 3/16; H04R 1/028; B42D 15/022
USPC ....................................................... 40/124.03
See application file for complete search history.

(56) References Cited

U.S. PATENT DOCUMENTS 2,487,138 A * 11/1949 Howe ...................... A63H 5/00 312/237
3,798,806 A * 3/1974 Sanford ............... B42D 15/022 40/124.03
4,102,067 A * 7/1978 Tarrant ................. B65D 5/4291 40/455
4,381,558 A * 4/1983 Bearden ................. G11B 33/06 369/68
4,614,266 A * 9/1986 Moorhead .............. B65D 79/00 206/216
5,056,660 A * 10/1991 Huang .................... G09F 25/00 206/232
5,973,250 A * 10/1999 Zirille ...................... G10H 1/26 84/600
6,523,285 B1 * 2/2003 Gilson ................. B42D 15/022 40/124.03
6,591,523 B2 * 7/2003 Pines ....................... G09F 25/00 40/124.03
6,675,511 B2 * 1/2004 Pines ......................... G09F 1/00 40/124.03
6,845,583 B2 * 1/2005 Lee ......................... G09F 25/00 40/124.03

(Continued)

FOREIGN PATENT DOCUMENTS

WO WO 2008/051653 5/2008

*Primary Examiner* — Brenda Bernardi
(74) *Attorney, Agent, or Firm* — Workman Nydegger

(57) ABSTRACT

In one example, a presentation sound box is provided that includes a first box portion, and a second box portion that is movable relative to the first box portion. A sound module is disposed within the box and includes a speaker, a processor, and memory accessible by the processor. The presentation sound box further includes a power source operable to drive the speaker and processor, a trigger device operable to connect and disconnect the power source and sound module, and an amplifying cover configured and arranged to at least partly enclose the speaker.

19 Claims, 20 Drawing Sheets

(56) References Cited

U.S. PATENT DOCUMENTS

| | | | | |
|---|---|---|---|---|
| 7,251,957 | B2 * | 8/2007 | Solomon | A44C 15/0015 63/19 |
| 7,600,336 | B2 * | 10/2009 | Hermanson | B42D 15/022 40/427 |
| 7,837,038 | B2 | 11/2010 | Chen | |
| 8,448,360 | B2 * | 5/2013 | Guo | B42D 15/022 40/124.03 |
| 2001/0011495 | A1 | 8/2001 | Song | |
| 2002/0175513 | A1 * | 11/2002 | Li | B42D 3/123 281/22 |
| 2007/0124673 | A1 * | 5/2007 | Trotto | G06F 1/1626 715/700 |
| 2007/0153638 | A1 * | 7/2007 | Lebbing | B44C 5/005 368/274 |
| 2008/0267592 | A1 * | 10/2008 | Fiala | A45C 11/16 386/248 |
| 2010/0198656 | A1 * | 8/2010 | Soroka | G06Q 30/02 705/7.29 |
| 2010/0287799 | A1 * | 11/2010 | Clegg | B42D 15/022 40/124.02 |
| 2011/0247247 | A1 * | 10/2011 | Mayer | B42D 15/022 40/124.03 |
| 2012/0031255 | A1 | 2/2012 | Stites | |
| 2015/0197117 | A1 * | 7/2015 | Begin | B42D 15/022 40/124.03 |
| 2015/0281816 | A1 * | 10/2015 | Boggess | H04R 1/028 381/332 |

* cited by examiner

PRESENTATION SOUND BOX

RELATED APPLICATIONS

This application hereby claims priority to, and the benefit of, U.S. Provisional Patent Application Ser. 62/011,247, entitled PRESENTATION SOUND BOX, filed Jun. 12, 2014, and incorporated herein in its entirety by this reference.

FIELD OF THE INVENTION

The present disclosure is generally directed towards packaging such as boxes and, in particular, to packaging that provides for playback of digital content when the packaging is manipulated in a particular way.

BACKGROUND

Manufacturers, salesman and others are constantly striving to find ways to distinguish their products and/or services from those of their competitors so as to gain a competitive advantage and thereby increase sales, market share, and consumer bases. These efforts are taking place in a variety of industries, however, the pace and nature of changes varies from one industry to another.

For example, developments in the greeting card and packaging industry have been relatively slow, and primitive. While greeting cards that play a pre-programmed tune have been available for some time, the use of media in connection with greeting cards has not progressed significantly beyond pre-programmed sound media. Likewise, the known uses of media in packaging tend to be rather limited and unsophisticated.

In light of considerations such as these, what is needed is packaging that includes programmable circuitry. It would also be useful to provide packaging that includes media, such as sound, that is related to the contents in the package. As well, it would be useful to provide packaging configured to enhance sound produced by an associated sound module. Finally, it would be useful to provide a variety of package configurations that can be used to trigger the playback of media associated with the packaging.

BRIEF SUMMARY OF ASPECTS OF SOME EXAMPLE EMBODIMENTS

Various disclosed example embodiments of the invention are directed to a presentation sound box that incorporates a sound module so that when the presentation sound box is manipulated in a particular manner, the sound module is activated and audible sound comes from the presentation sound box.

The embodiments disclosed herein do not constitute an exhaustive summary of all possible embodiments, nor does this summary constitute an exhaustive list of all aspects of any particular embodiment(s). Rather, this summary simply presents selected aspects of some example embodiments. It should be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular effect(s).

In particular, example embodiments within the scope of this disclosure are contemplated as including one or more of the following elements, in any combination: a package including circuitry that produces sound in response to manipulation of the package; a switch or sensor that is operable or activated by manipulation of one or more parts of a package; programmable circuitry configured to be integrated together with packaging; a sound module configured to be integrated with a package at the time of manufacture of the package, or added to the package after manufacturing of the package is completed; a package configured to affect sound produced by an associated sound module; a package that includes a media module, such as a sound module, configured to record content such as audio and/or video digital media; a package that includes a media module, such as a sound module, configured to play back content such as audio and/or video digital media, where the content can be recorded by the media module and/or pre-programmed in the media module; a sound module having content related to the actual or expected contents of an associated package; a sound module configured to operate in connection with a switch or sensor; an amplifying cover for a package such as a box; a sound module configured for wireless communication with a source of digital content; switches such as TACT switch, LDR sensor, and reed switch; sensors such as motion sensors and photosensitive sensors; a media module configured to record and/or play back digital media such as sound and video; a media module configured to play back respective portions of content in a particular order and/or randomly; a box with one side hinged; a box with a lid and base; a box with a tray and sleeve; and. a box with a book style configuration.

In one particular example embodiment, a package is provided that incorporates a media module so that when the package is manipulated in a particular manner by a user, the media module is activated and digital content is played back by the media module so as to be perceptible by the user.

In a second example embodiment, a package is provided that incorporates a media module so that when the package is manipulated in a particular manner by a user, the media module is activated and digital content is played back by the media module so as to be perceptible by the user, and the digital content includes audible and/or visible elements.

In a third example embodiment, a package is provided that incorporates a media module so that when the package is manipulated in a particular manner by a user, a trigger device activates the media module and digital content is played back by the media module so as to be perceptible by the user.

In a fourth example embodiment, a presentation sound box is provided that incorporates a sound module so that when the presentation sound box is manipulated in a particular manner, the sound module is activated and the sound module plays back digital content and produces audible sound.

In a fifth example embodiment, a presentation sound box is provided that incorporates a sound module so that when the presentation sound box is manipulated in a particular manner, the sound module is activated and the sound module plays back digital content and produces audible sound, and the presentation sound box is configured to amplify sound produced by the sound module.

In a sixth example embodiment, a presentation sound box is provided that incorporates a sound module so that when the presentation sound box is manipulated in a particular manner, a trigger device activates the sound module and the sound module plays back digital content and produces audible sound.

In a seventh example embodiment, a presentation sound box is provided that incorporates a sound module so that when the presentation sound box is manipulated in a particular manner, a trigger device activates the sound module and the sound module plays back digital content and produces audible sound, and the trigger device includes a switch and/or a sensor.

In an eighth example embodiment, a package is provided that incorporates a media module so that when the package is manipulated in a particular manner by a user, the media module is activated and digital content is played back by the media module so as to be perceptible by the user, and the media module is programmable so that selected digital content can be added to the media module for playback.

BRIEF DESCRIPTION OF THE DRAWINGS

The appended drawings contain figures of various example embodiments to further illustrate and clarify the above and other aspects of example embodiments of the present invention. It will be appreciated that these drawings depict only example embodiments of the invention and are not intended to limit its scope. The invention will be described and explained with additional specificity and detail through the use of the accompanying drawings in which.

DETAILED DESCRIPTION OF SOME EXAMPLE EMBODIMENTS

Figure 1:
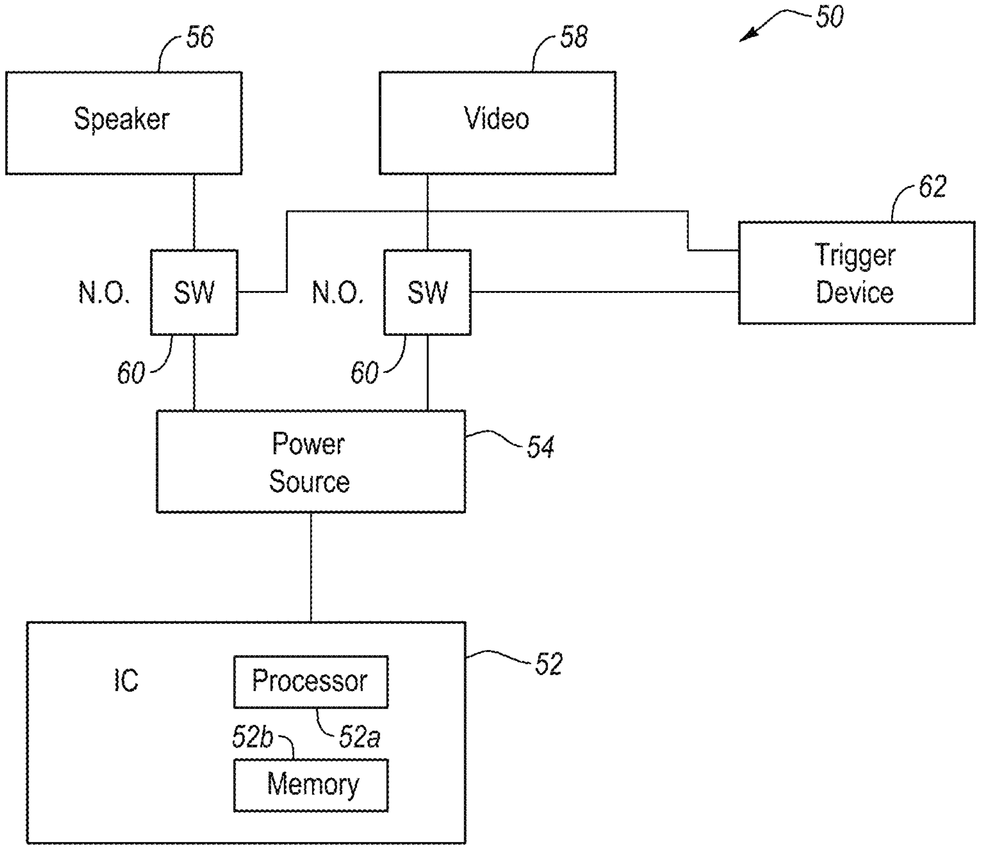
FIG. 1 is a diagram showing basic elements of media module circuitry such as may be employed in embodiments of the invention.

With reference now to the figures, details are provided concerning aspects of example embodiments of the invention. In general, embodiments of the invention are concerned with packaging such as boxes and, in particular, to packaging that provides for playback of digital content when the packaging is manipulated in a particular way.

By way of illustration, in order to play back content, such as audible and/or visible content, when a package such as a box is opened, the lid closure is equipped with one or more switches that control playback of the sound and/or other content. When the box lid is closed, the electric circuit powering the sound is turned off. In at least some embodiments, the sound module includes a speaker, integrated circuit (IC) chip including a processor and memory, printed circuit board (PCB) that includes the IC, battery or other power source, and a trigger device that includes a switch. The module can be built into the gift box when the gift box is produced, although that is not required and, in other instances, attachment of the module may be a manufacturing step that takes place after the box has been produced. In other cases, the module can be purchased separately from the gift box and then attached to the gift box by a user.

The triggers of the sound module, which can be built into the box or connected to the box after the box has been manufactured, are operated in connection with the structure of the box. In particular, manipulation of one or more parts of the box, such as opening or closing a box lid for example, may cause operation of a trigger that then activates a media module, such as a sound module, to play back content. As disclosed elsewhere herein, there are a variety of box formats that can be used for presentation sound boxes.

The speaker of the sound module can use a combination of technological specifications to clearly play one or more sounds. This sound clarity can be used to gain the attention of the box recipient with clear understanding of the audio content. Where a media module is provided, sound and video can both be played. Example sounds that could be played when a sound module is activated include an audio message to a friend on their birthday, or a university fight song that plays when college football season tickets are delivered in the box to a fan. As these examples suggest, embodiments of the invention are not limited to any particular type, volume, duration, or combination of sound(s).

In addition to the box, and sound module, at least some embodiments of packages such as boxes include an amplifying cover that fits over the sound module. The placement of the cover over the sound module can create more volume and/or emphasize certain frequencies of the sound, such as low end bass frequencies for example. This use of an amplifying cover over the sound module can be useful as the resultant higher volume can evoke emotion, such as excitement or nostalgia, for example, which makes the presentation a memorable, and repeatable, experience for the recipient and others who may be present.

The IC chip of the sound module can be programmed in any suitable manner by a user, though it can alternatively be pre-programmed at the time of manufacture of the box. Example IC chip programming schemes may provide the purchaser with pre-loaded audio and/or video or other content and/or enable a wireless function for the purchaser, using the Bluetooth protocol for example, so that after the box or other package is purchased, the purchaser can wirelessly access content and then wirelessly load that content on the IC chip for playback. The IC chip can be configured to limit the number of times it can be programmed, or may be configured to allow an unlimited number of programming events.

In some embodiments, the box or other package is provided with one or more pre-loaded song(s) and/or other content on the IC chip that cannot be changed by the purchaser. Alternatively, the purchaser of the box could program the IC chip, such as, for example, by recording a personalized message, and/or the purchaser could load other audio and/or video or other content to the module, such as a selection from their music library, in the particular example of a sound module. This recording process can be accomplished wirelessly in at least some embodiments, although a hard-wire or optical fiber based recording process can alternatively be employed. Where content is accessed and/or loaded using wireless communication, the accessing and/or loading can take place by way of a network, such as a local area network (LAN), or a wide area network (WAN), or the internet.

In some cases, the pre-programmed content can be configured in connection with one or more menus that enable a user to select one or more pieces of content best suited to the application or event contemplated by the user. The menu could include, for example, a variety of different songs, videos, pictures, or any other content that can be played back in a way that is perceptible to a user. By using the pre-programmed menus and content, the user can create a customized grouping of content but without having to actually perform any programming.

A. Some Example Product Applications

Delivering event tickets in a presentation sound box is a great way to evoke excitement with fans before they attend the event. The sound will motivate the recipient, especially in the case of season tickets delivered to the major fans of a sports team. As noted elsewhere herein, the sound could include a team fight song for example. Additionally, or alternatively, the content played back by the box or other package could include one or more video clips, such as a clip of a player scoring a touchdown in a previous season. Thus, the content played back by the box may be relevant to the box contents and/or to an associated event, and may also excite particular feelings or other responses in the user who opens the box.

As another example, music performers and music event organizers could use these boxes when sending out tickets to their show or sets of shows, pre-loading song content, interviews, and/or other content from the artist, and building excitement for the event. Likewise movie producers and studios could use such packages when promoting a movie, similar to providing trailers on television or movie screens, but in connection with a package that could include physical content relating to a movie, such as movie tickets for example.

At least some of the example box formats disclosed herein are durable so that physical content, such as the ticket stubs from the shows, could be placed back in the box after the event and kept around the house as memorabilia. Too often, people attend a show that was “unforgettable” and return home with their tickets, unsure as to how to keep and preserve the tickets. Inside a ticket box that plays music from that artist is the perfect way to store the memory of that performance. The outside of the box could include graphics and text relating to, for example, the artist, show, venue and/or other aspects relating to the performance. The user could also program the sound module with his impressions immediately after the show, and then be reminded of the show, even years later, when listening to his recorded impressions.

Welcome packs and starter kits are also possible uses for at least some embodiments of the presentation sound boxes and/or other packages and media modules disclosed herein. The sound may or may not be in the form of a song, or could include a song combined with voice instructions, and/or any other audio content. Video content could also be provided. For example, a welcome pack for a 10-week study at home set of educational materials would inspire and instruct the end-user on how to get started. The exceptional sound clarity of at least some embodiments of the presentation box can help to ensure that the recipient is able to understand the message.

Other packs and kits delivered to a consumer can contain many different items packed into a presentation sound box. The audio greeting can provide audio instructions to the end-user to help them sort through all of the items they have received. Often complicated sets of product are packed together and it is overwhelming for the end-user to understand everything they have received when it all arrives together. A presentation sound box, or other package having audio and/or video content, can provide an immediate explanation to the complicated package contents, and the content can be replayed as necessary. This functionality can be useful as well in boxes that include materials that must be assembled by the purchaser.

The presentation sound box, or other package, with pre-loaded content is equipped with a function that can allow sequential song or voice greetings each time the box is opened. Thus, for example, an elderly person who needs medicinal instruction or other reminders each day of the week could benefit from the function of this box. When opened the first time, the box will play message one and after the box is closed, the sound module can be programmed to automatically jump to the next message the second time the box is opened. So if opened once/day, for example, there could be 7, or any other number of, messages loaded, with a different one to be played each day. Video and/or other visually perceptible content could additionally or alternatively be included in this, and any other, embodiment disclosed herein.

With this use of sequential pre-programmed audio, these boxes could be used as an educational tool for kids. The box can hold printed lesson content, pencils, calculators, etc. and the sound module can be programmed, for example, with the numbers 1-100 in Spanish language, and the user could open and close the box to hear the next number. While the box is closed, the user can do writing exercises or use other materials which came originally packaged in the presentation sound box.

B. Example Media Module

With reference first to FIG. 1, details are provided concerning a media module, one example of which is denoted generally at 50. The media module 50 can include an integrated circuit (IC) 52 having a processor 52*a* and a memory 52*b*. As noted herein, the memory 52*b* can be preprogrammed with various digital content that is to be played back when the media module 50 is triggered by a trigger device. The processor 52*a* can control the operations of the media module 50. The media module 50 further includes a power source 54 that is connected to the IC 52, and is also connected to a speaker 56 and/or to a video playback device 58, by way of one or more switches 60, which may be normally open (N.O.) switches. Various examples of switches 60 are disclosed elsewhere herein. Finally, the switches 60 are connected to a trigger device 62 that, when triggered, closes or causes the closure of, switches 60, thereby enabling power from the power source 54 to flow to the speaker 56 and/or video playback device 58. Content from the memory 52*b* can then be played back by way of the speaker 56 and/or video playback device 58. The trigger device 62 can be reset or otherwise operated such that one or both of the switches 60 are opened, cutting off power to the speaker 56 and/or video playback device 58.

C. Examples of Amplifying Covers

As noted earlier, some packages within the scope of the invention are configured to provide one or more desired effects with respect to content played back by sound modules or other media modules. For example, in some embodiments of the presentation sound box use a speaker of at least about 1 watt that is partially, or completely, hidden under an amplifying cover that is placed into the box. One or more speakers of greater, or lesser, wattage could also be used. In some embodiments, the cover resides on top of the speaker in the box base so that the edge of the speaker touches, or is located near, the underside of the cover. The cover should have a set of holes to allow the sound to escape. Further aspects of example amplifying covers are discussed below in connection with FIG. 2*a*-4.

As shown in FIG. 2*a*-4, an amplifying cover for a package, such as a box, can be provided that is sized and configured to fit in the interior of a box (not shown). The configurations shown in FIG. 2*a*-4 are presented solely by way of example, and is not intended to limit the scope of the invention in any way. One example of an amplifying cover, which may also be referred to herein as an amplifier insert, is denoted generally at 100 in FIG. 2*a*-4. The amplifying cover 100 can be made of any suitable material(s) and can take the form of a single piece of material, or multiple pieces attached together. Example construction materials for the amplifying cover embodiments disclosed herein, including the amplifying cover 100, include, but are not limited to, foam, rubber, plastic, paper, cardboard, paperboard, paper Mache, and any combination of these.

Figure 2A:
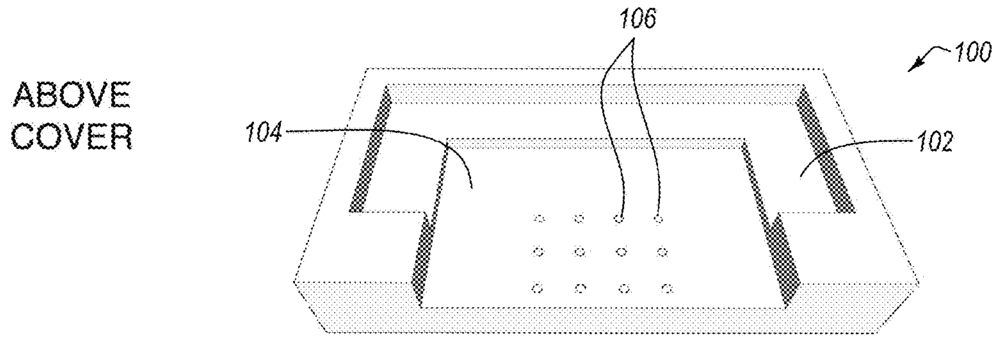
FIG. 2*a* is a bottom view of an example of an amplifying cover.

FIG. 2*a* discloses a top perspective view of the amplifying cover 100. As shown there, the amplifying cover 100 may include one or more cutouts, shelves 102 and/or recesses 104 sized and configured to accommodate speakers, switches and/or other elements of a media module (see, e.g., FIG. 5) and associated devices and systems. Additionally, or alternatively, elements such as the shelves 102 and recesses 104 can be sized, configured, and oriented to collectively implement an amplification structure that can amplify sound emitted from within, or near, the amplifying cover 100. See, e.g., FIG. 5.

Figure 2B:
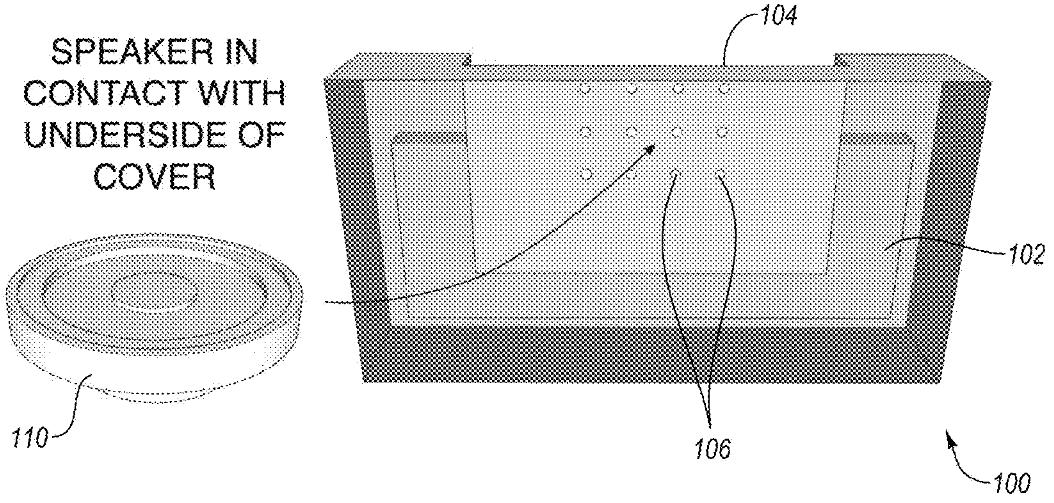
FIG. 2*b* is a top view of the amplifying cover of FIG. 2*a;*

With continued reference to FIG. 2*a*-4, and particularly FIG. 2*b* which is a bottom perspective view, the amplifying cover 100 can include a series of holes or other openings 106 that, in general, enable sound from one or more speakers, such as speaker 110, to pass more effectively and efficiently into the interior of the amplifying cover 100. The speaker 110 can be positioned immediately below, or near, the openings 106.

Figure 3:
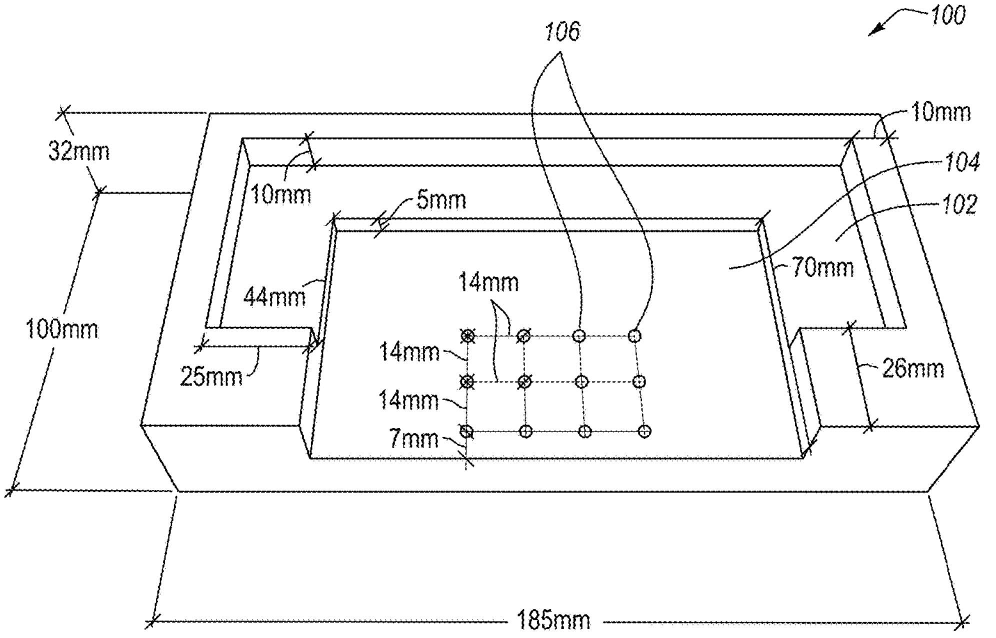
FIGS. 3 and 4 disclose example dimensions for an amplifying cover.

With particular reference to FIG. 3, some example dimensions for an embodiment of the amplifying cover 100 are shown. These dimensions are presented only by way of example and are not intended to limit the scope of the invention in any way.

Figure 4:
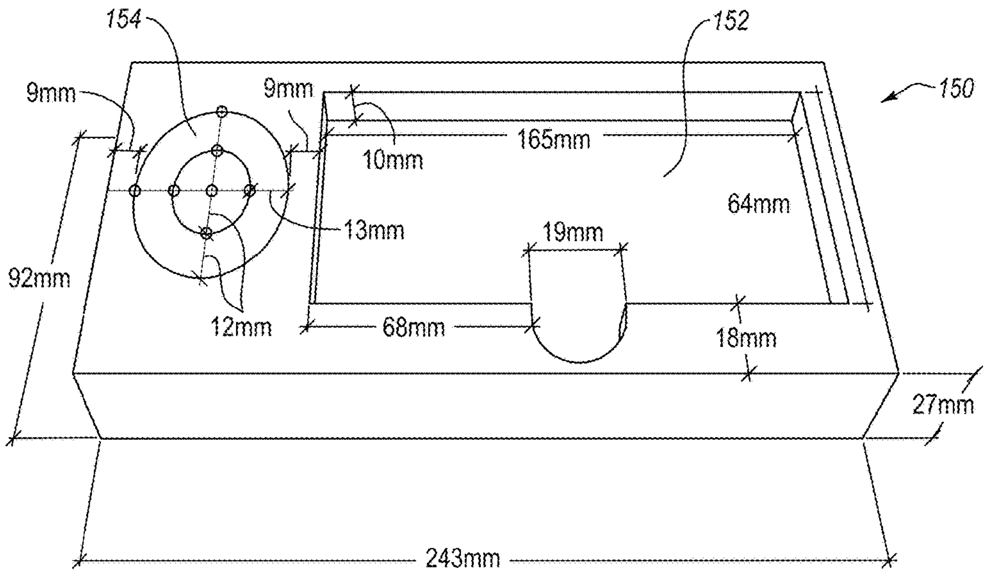

Turning now to FIG. 4, an alternative embodiment of an amplifying cover, shown in a top perspective view and denoted generally at 150, is disclosed. The amplifying cover 150 includes a cutout 152 that may be sized, configured and oriented to accommodate speakers, switches and/or other elements of a media module (see, e.g., FIG. 5) and associated devices and systems. As further indicated in FIG. 4, an area 154 can be designated for placement of a speaker (not shown in FIG. 4). The size, location and orientation of the area 154 are presented only by way of example, and any other suitable portion(s) of the amplifying cover 150 could additionally, or alternatively, be designated for placement of one or more speakers. While not specifically shown in FIG. 4, it should be understood that the area 154 can be cutout or otherwise removed to the extent necessary to accommodate a speaker, or speakers.

D. Example Box Constructions and Content Playback Triggers

As should be apparent, there are any number of box constructions that are suitable for a presentation sound box, or other package that can play back sound, video and/or other content when the package is manipulated in a particular way. For example box constructions include: Box Construction A—Box with one side hinged; Box Construction B—Lid and Base; Box Construction C—Tray and Sleeve; and, Box Construction D—Book Spine. These examples are provided for the purposes of illustration and are not intended to limit the scope of the invention in any way. In general, the disclosed boxes are referred to herein as including, among other things, a base and a lid/cover. As discussed below, various configurations and arrangements of bases and lids/covers are possible.

The example box constructions, and others, can be used with a variety of different types of triggers that, when operated in response to manipulation of the box or other package, cause playback of digital content. Three example trigger types include: Trigger A—TACT Switch; Trigger B—LDR Sensor; and, Trigger C—Reed Switch. These examples are provided for the purposes of illustration and are not intended to limit the scope of the invention in any way. With respect to the reed switches, a variety of different configurations can be employed. For example, a normally closed (N.C.) reed switch can be used. In this case, normally closed refers to the fact that, absent any controlling influence such as magnets and/or comparable circuitry for example, the reed switch is in a closed state. Such a switch can be maintained in an open state by one or more magnets or comparable circuitry. Thus, when the magnet(s) and reed switch are moved apart from each other, the reed switch moves to a closed state. As well, some reed switches can be configured to be either normally open (N.O.) or normally closed (N.C.), and such reed switches can be employed with any embodiment herein that uses a reed switch.

The box constructions and sound triggers can be combined in a variety of different ways. Accordingly, some example combinations of box constructions and triggers are set forth below. It should be noted that the scope of the invention is not limited to these example combinations and, more generally, any trigger(s) can be used in connection with any box or other package.

Figure 5:
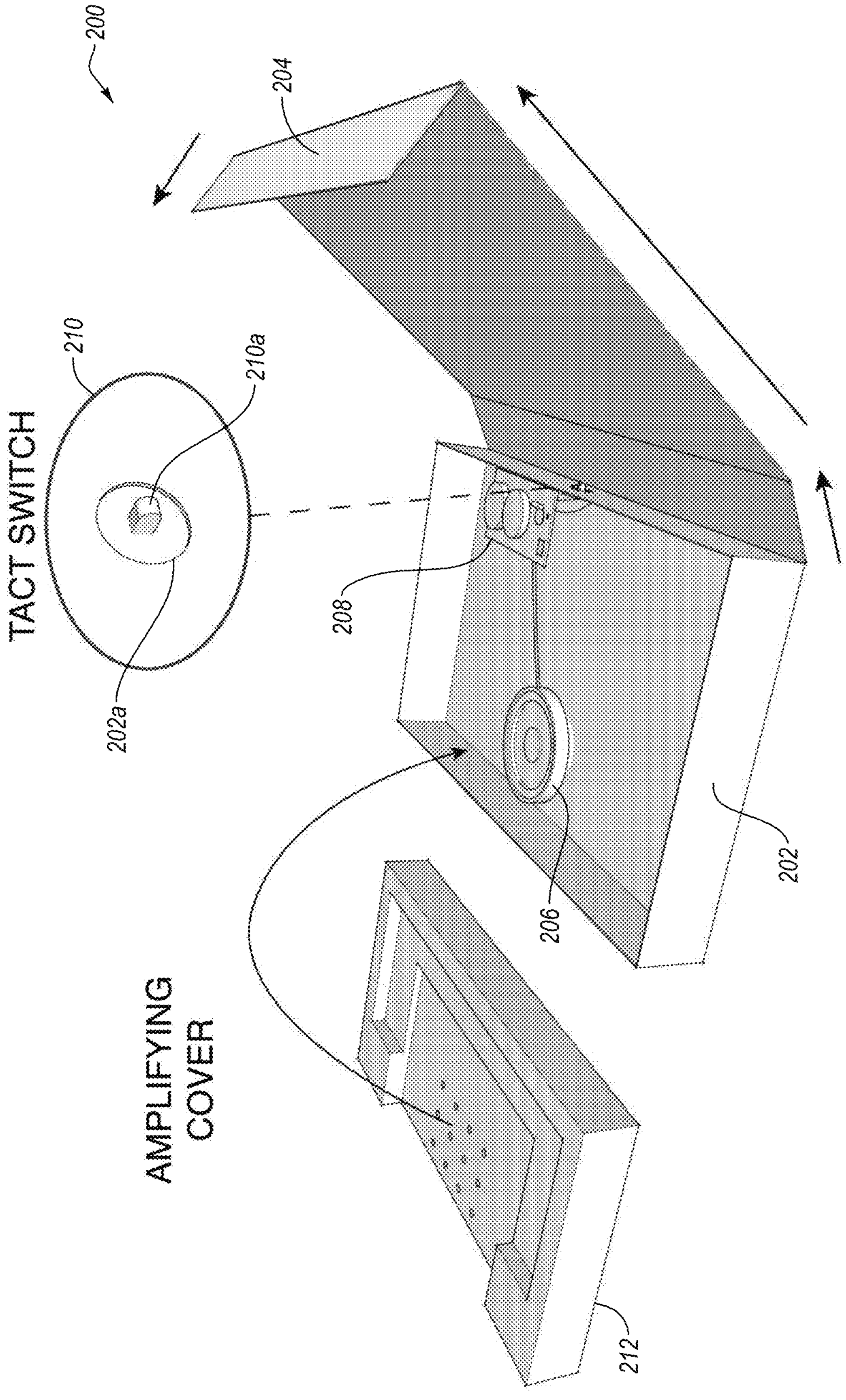
FIG. 5 discloses aspects of a presentation sound box including a cover attached to a box in a hinge configuration.
Figure 6:
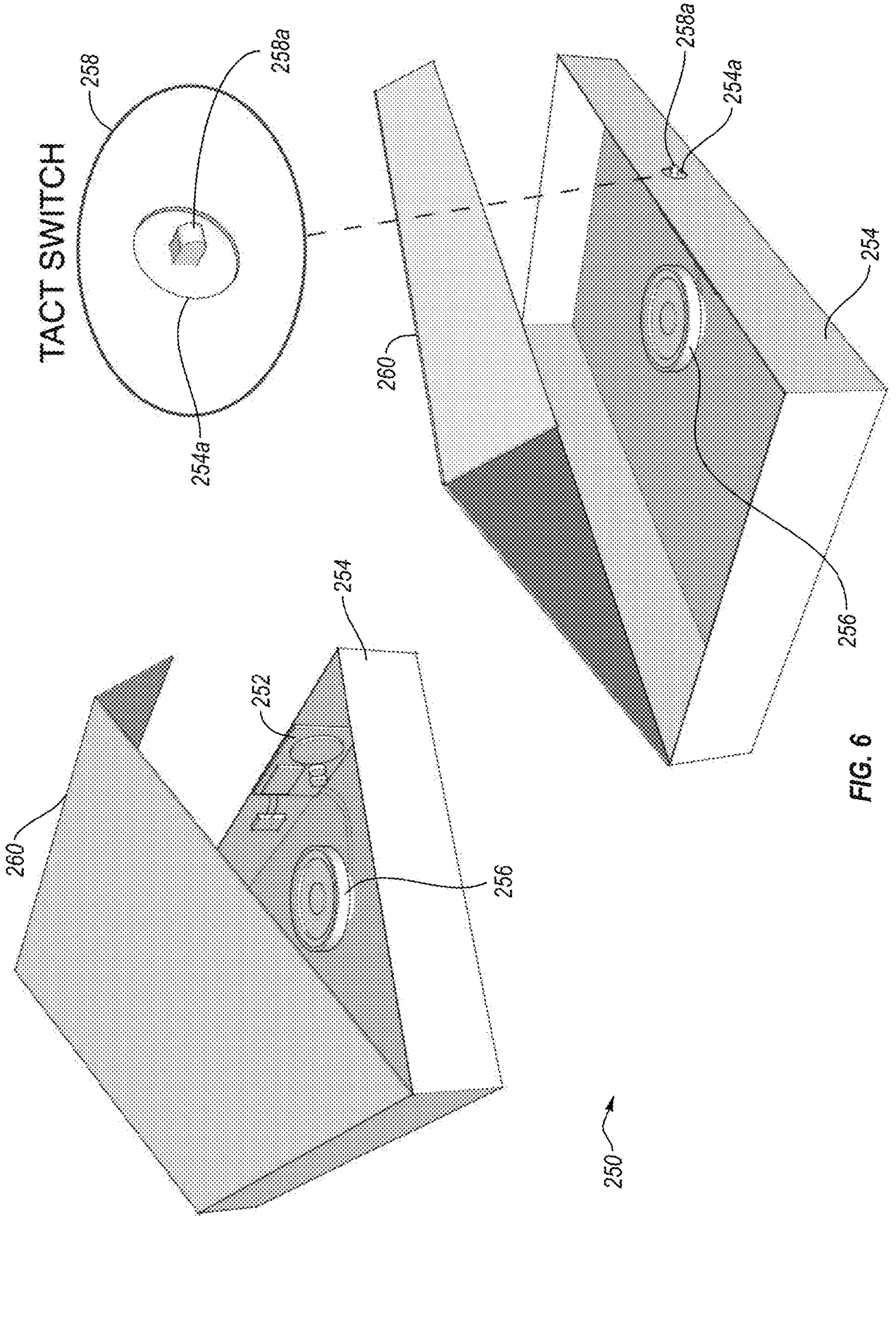
FIG. 6 discloses aspects of another example of a presentation sound box including a cover attached to a box in a hinge configuration.

With attention now to FIGS. 5 and 6, details are provided concerning a first example combination of trigger and box. In particular, Example 1—Trigger A: TACT SWITCH+Box Construction A: Box with one side hinged. With reference first to FIG. 5, a presentation media package, one example of which is a presentation sound box, is denoted generally at 200. As shown, the presentation media package 200 includes a base 202 to which a lid 204 is attached in a hinge arrangement. One or more speakers 206 are provided in the base 202, along with a media module 208, such as a sound module or any other media module configured to play back content such as digital content. A trigger device 210, which can be a TACT switch for example, is also provided that is operably connected to the media module 208 so that when the trigger device 210 is operated, such as by manipulation of the lid 204, the media module 208 will play back content. In this particular embodiment, the trigger device 210 is configured and arranged such that an activation button 210*a* of the trigger device 210 can be acted upon by the lid 204. More specifically, the activation button 210*a* is arranged to protrude through an opening 202*a* defined at the back of the base 202 when the lid 204 is positioned as shown in FIG. 5. As further indicated in FIG. 5, an amplifying cover 212 is shown placed over the media module 208 and the speaker 206.

In operation, when the lid 204 closes, the activation button 210*a* is depressed. As the activation button 210*a* is depressed, a circuit of the media module 208 is opened, keeping the media module 208 "OFF." When the lid 204 is opened, the activation button 210*a* is released, completing the circuit, and playback of media, such as sound, is enabled and occurs.

It should be noted that in any of the disclosed embodiments, a trigger device can be used to connect, and disconnect, a power supply to/from a media module. For example, the trigger device can be configured and arranged so that when the trigger device is in a first state, the trigger device disconnects the power supply from the media module, and when the trigger device is in a second state, the trigger device connects the power supply to the media module. As disclosed elsewhere herein, the state of the trigger device can be a function of the particular type of trigger device employed.

As well, in any of the disclosed embodiments, the media module or a circuit of the media module can include a power supply circuit to which a trigger device is connected. The power supply circuit, when closed, can supply power to the media module. The trigger device can either directly, or indirectly such as by way of other components, open and close the power supply circuit, thereby disabling or enabling, respectively, the media module.

An alternative embodiment of a presentation media package, denoted at 250 in FIG. 6, may be similar to the presentation media package 200. In the example of FIG. 6 however, the media module 252 can be located at the front of the base 254, while the speaker 256 is positioned in the bottom of the base 254, similar to the arrangement of speaker 206 in FIG. 5. As further indicated in FIG. 6, a trigger device 258, such as a TACT switch for example, can be located at the front of the base 254 and, thus arranged, can be acted upon by the lid 260. The trigger device 258 may include an activation button 258*a* that is able to extend through and opening 254*a* defined by the base 254. Operation of the media module 252 proceeds substantially the same as the media module 208, described above in connection with FIG. 5, when the lid 260 is closed, and then opened.

Figure 7:
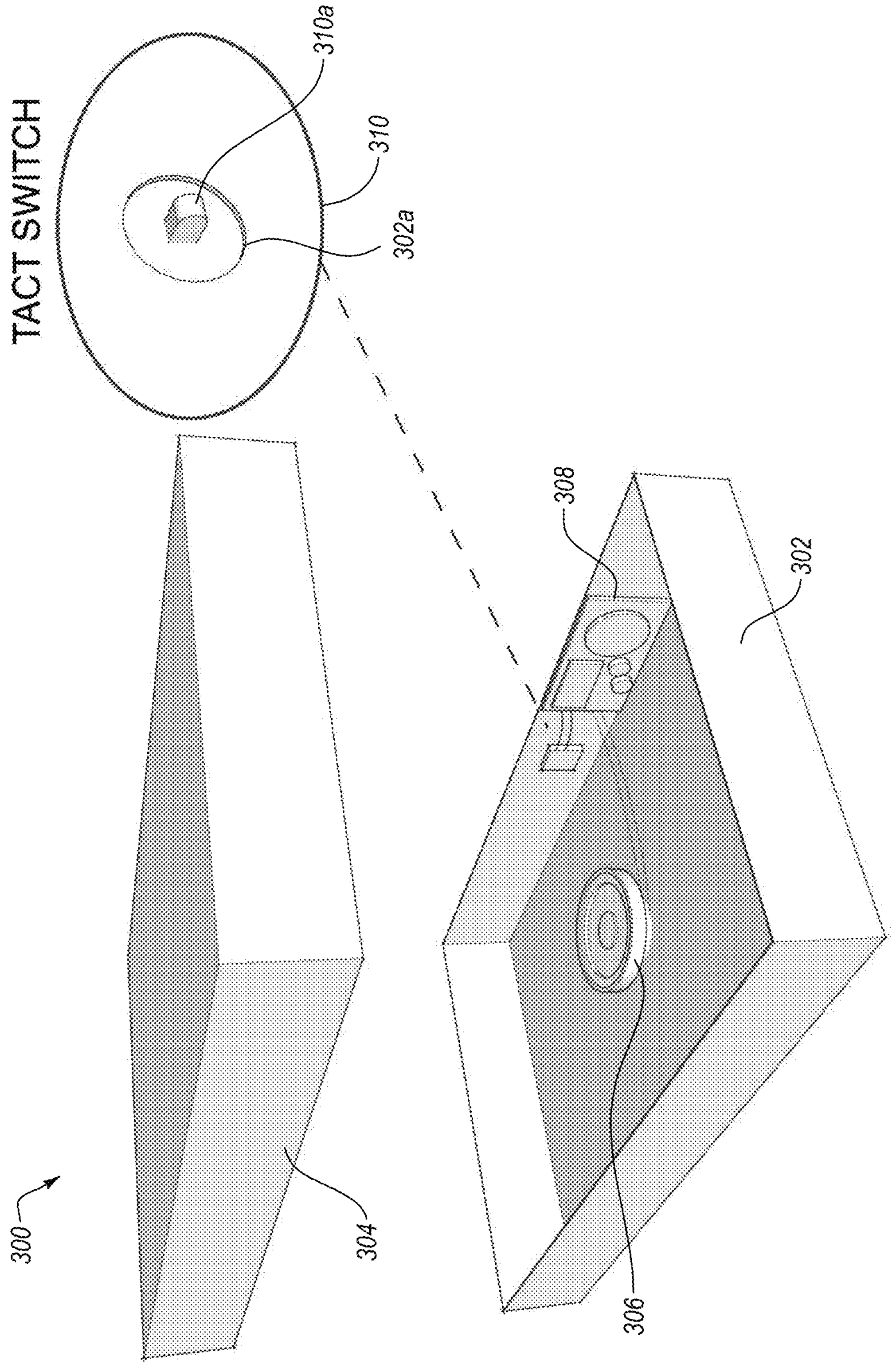
FIG. 7 discloses aspects of a presentation sound box including a cover that fits down over a box.

With attention now to FIG. 7, details are provided concerning a second example combination of a trigger and a box. In particular, Example 2—Trigger A: TACT SWITCH+ Box Construction B: Box with lid/base configuration. As shown in FIG. 7, a presentation media package, one example of which is a presentation sound box, is denoted generally at 300. As shown, the presentation media package 300 includes a base 302 configured to removably receive a separate lid 304. One or more speakers 306 are provided in the base 302, along with a media module 308, such as a sound module or any other media module configured to play back content such as digital content. A trigger device 310, which can be a TACT switch for example, is also provided that is operably connected to the media module 308 so that when the trigger device 310 is operated, such as by manipulation of the lid 304, the media module 308 will play back content. In this particular embodiment, the trigger device 310 is configured and arranged such that an activation button 310*a* of the trigger device 310 can be acted upon by the lid 304 as the lid 304 is placed on the base 302. More specifically, the activation button 310*a* is arranged to protrude through an opening 302*a* defined by the base 302 when the lid 304 is positioned on the base 302. While not specifically indicated in FIG. 7, an amplifying cover (see, e.g., FIGS. 3 and 4) can be placed over the media module 308 and the speaker 306. In general, the trigger device 310 of FIG. 7 can be placed on any side of the base 302.

Figure 8:
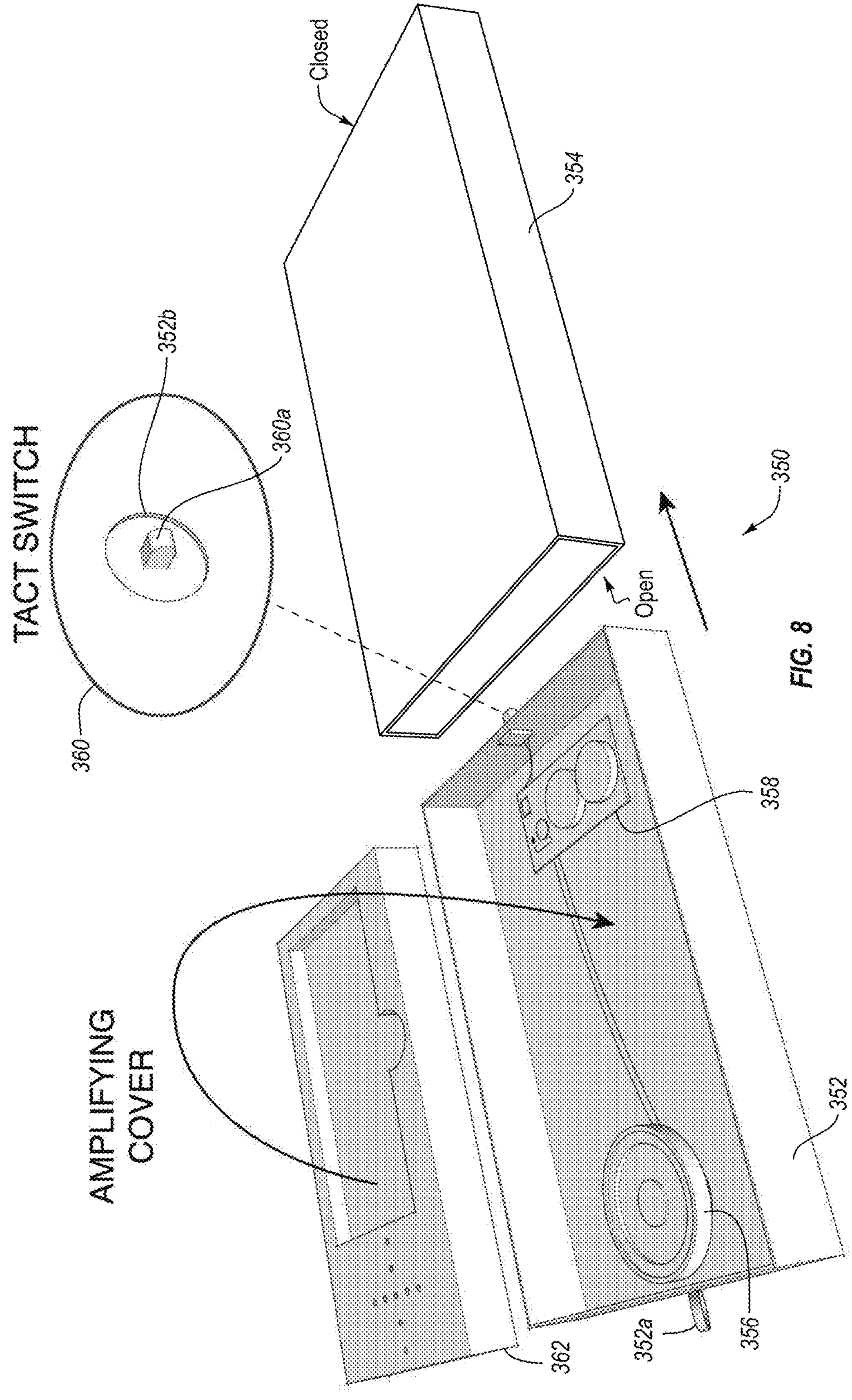
FIG. 8 discloses aspects of a presentation sound box having a drawer and sleeve configuration.

Turning now to FIG. 8, details are provided concerning a third example combination of a trigger and a box. In particular, Example 3—Trigger A: TACT SWITCH+Box Construction C: Box with tray and sleeve configuration. As shown in FIG. 8, a presentation media package, one example of which is a presentation sound box, is denoted generally at 350. As shown, the presentation media package 350 includes a base 352 in the form of a tray that is configured to be removably received in a cover in the form of a sleeve 354 that is open at one end and closed at the other. The base 352 can include a handle 352*a* or other mechanism that enables a user to slide the base 352 out of, and into, the sleeve 354. One or more speakers 356 are provided in the base 352, along with a media module 358, such as a sound module or any other media module configured to play back content such as digital content. A trigger device 360, which can be a TACT switch for example, is also provided that is operably connected to the media module 358 so that when the trigger device 360 is operated, such as by manipulation of the sleeve 354, the media module 358 will play back content. In this particular embodiment, the trigger device 360 is configured and arranged such that an activation button 360*a* of the trigger device 360 can be acted upon by the sleeve 354. In one variation of the present embodiment, multiple trigger devices 360 can be employed such that a gradual removal of the base 352 from the sleeve 354 can cause sequential playback of content.

In this specific case, the activation button 360*a* is arranged to protrude through an opening 352*b* defined by the base 352 when the base 352 has been sufficiently retracted from within the sleeve 354. Thus, in operation, when the base 352 is pushed all the way into the back of the sleeve 354, the activation button 360*a* is depressed, thereby opening the media module 358 circuit. As the base 352 is pulled out of the sleeve 354, the activation button 360*a* of the trigger device 360 is released, the circuit is completed, and playback of content such as sound by the media module 358 is enabled. Finally, an amplifying cover 362 may be provided that can be placed over the media module 358 and the speaker 356.

Figure 9:
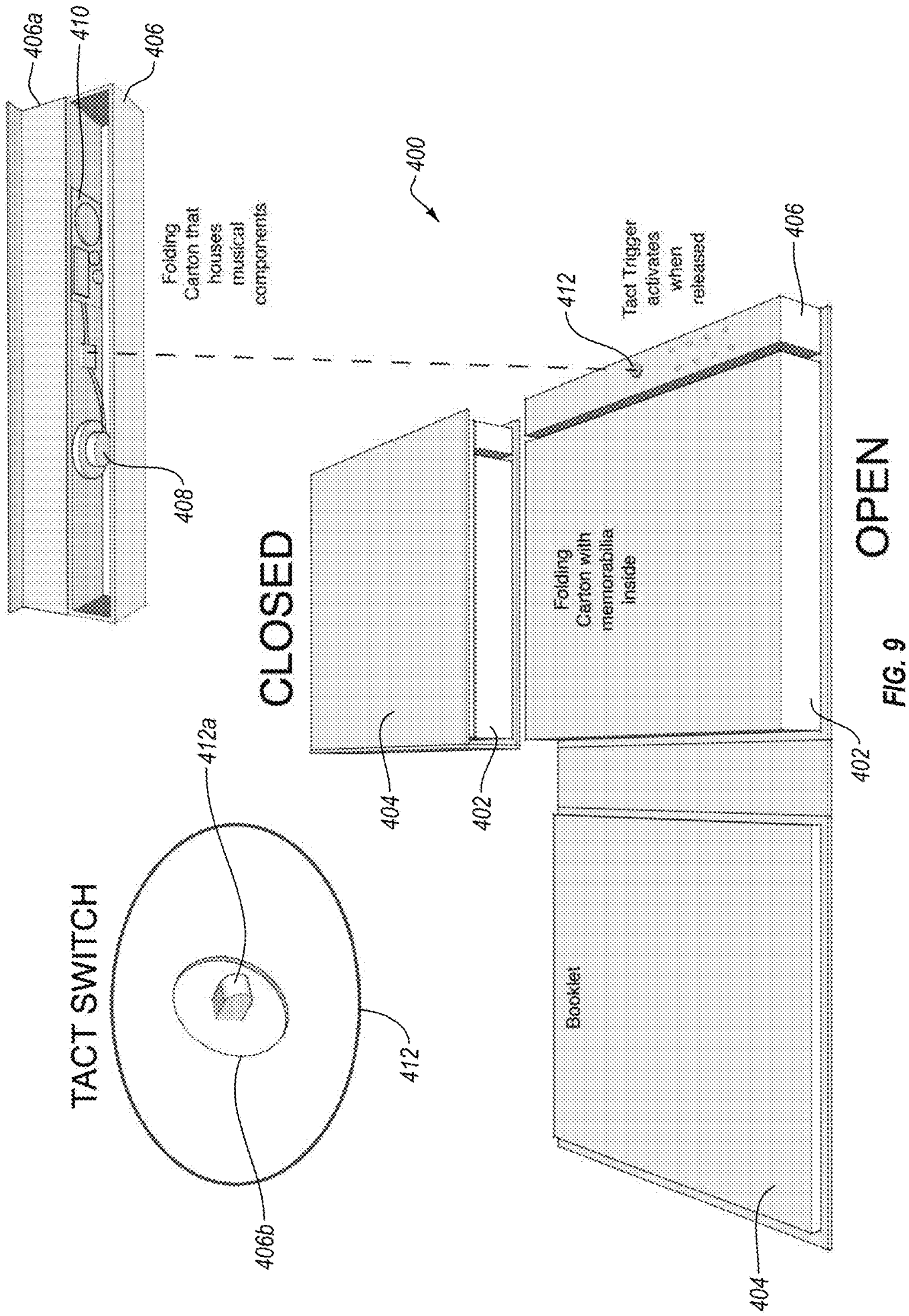
FIG. 9 discloses aspects of a presentation sound box in a book style configuration.

Turning now to FIG. 9, details are provided concerning a fourth example combination of a trigger and a box. In particular, Example 4—Trigger A: TACT SWITCH+Box Construction D: Book Style Box. As shown in FIG. 9, a presentation media package, one example of which is a presentation sound box, is denoted generally at 400. As shown, the presentation media package 400 includes a base 402 to which a cover 404 is attached, similar to the manner of a cover of a book for example. The base 402 is sized and configured to hold one or more items. Spaced apart from the base 402, but still arranged to be covered by the cover 404 is a compartment 406. In some embodiments, the compartment 406 is part of the base 402 and, as such, is defined by a partition (not shown) within base 402. The compartment 406 can include a lid 406*a* that permits access to the interior of the compartment 406. One or more speakers 408 are provided in the compartment 406, along with a media module 410, such as a sound module or any other media module configured to play back content such as digital content. A trigger device 412, which can be a TACT switch for example, is also provided that is operably connected to the media module 410 so that when the trigger device 412 is operated, such as by manipulation of the cover 404, the media module 410 will play back content. In this particular embodiment, the trigger device 412 is configured and arranged such that an activation button 412*a* of the trigger device 412 can be acted upon by the cover 404 as the cover 404 is closed on the base 402. More specifically, the activation button 412*a* is arranged to protrude through an opening 406*b* defined by the box compartment 406 when the cover 404 is closed on the base 402. In the embodiment of FIG. 9, the compartment 406, which houses the speaker(s) 408, can implement an amplifying function such as that provided by the amplifying covers disclosed herein. In operation, when the cover 404 is closed, the activation button 412*a* is depressed. As the activation button 412*a* is depressed, the circuit including the media module 410 is opened, keeping the media module 410 "OFF." When the cover 404 is opened, the electric circuit is completed and playback of sound and/or other content by the media module 410 occurs.

Figure 10:
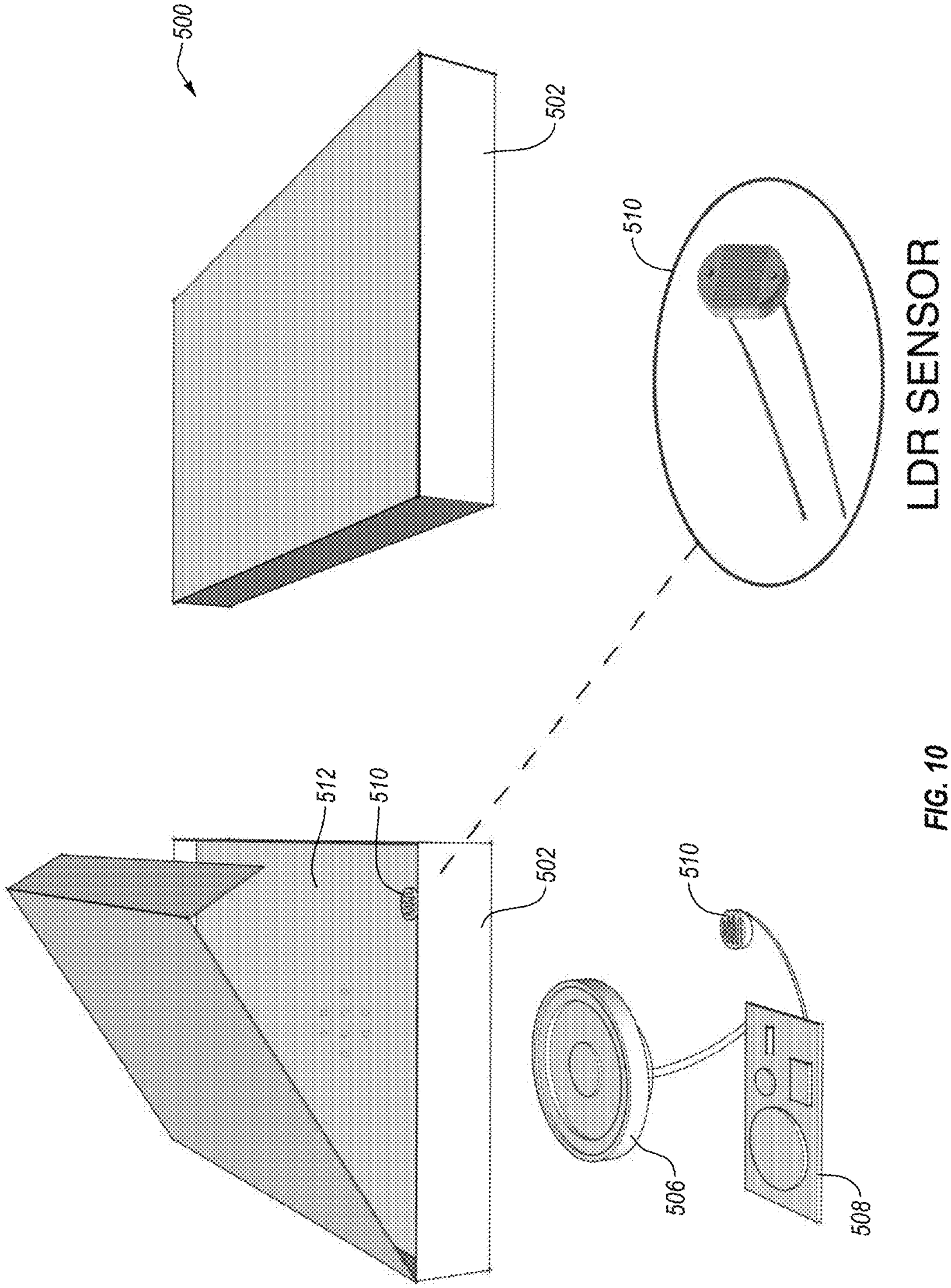
FIG. 10 discloses aspects of a presentation sound box having a configuration similar to that of FIG. 6 but employing a different type of switch.

Directing attention now to FIG. 10, details are provided concerning a fifth example combination of a trigger and a box. In particular, Example 5—Trigger B: LDR SENSOR+Box Construction A: box with one side hinged. As shown in FIG. 10, a presentation media package, one example of which is a presentation sound box, is denoted generally at 500. As shown, the presentation media package 500 includes a base 502 to which a lid 504 is attached in a hinge arrangement. One or more speakers 506 are provided in the base 502, along with a media module 508, such as a sound module or any other media module configured to play back content such as digital content. A trigger device 510, which can be an LDR sensor (photo/light sensor) for example, is also provided that is operably connected to the media module 508 so that when the trigger device 510 is activated, such as by manipulation of the lid 504, the media module 508 will play back content. In this particular embodiment, the trigger device 510 is configured and arranged such that when the lid 504 is closed, little or no light reaches the trigger device 510 and, as a result, the circuit of the media module 508 remains open. As the lid 504 opens, the trigger device 510 is exposed to light outside of the box and the circuit is closed, enabling the media module 508 to play back content. As further indicated in FIG. 10, an amplifying cover 512 is provided and can be configured to receive the trigger device 510.

Figure 11:
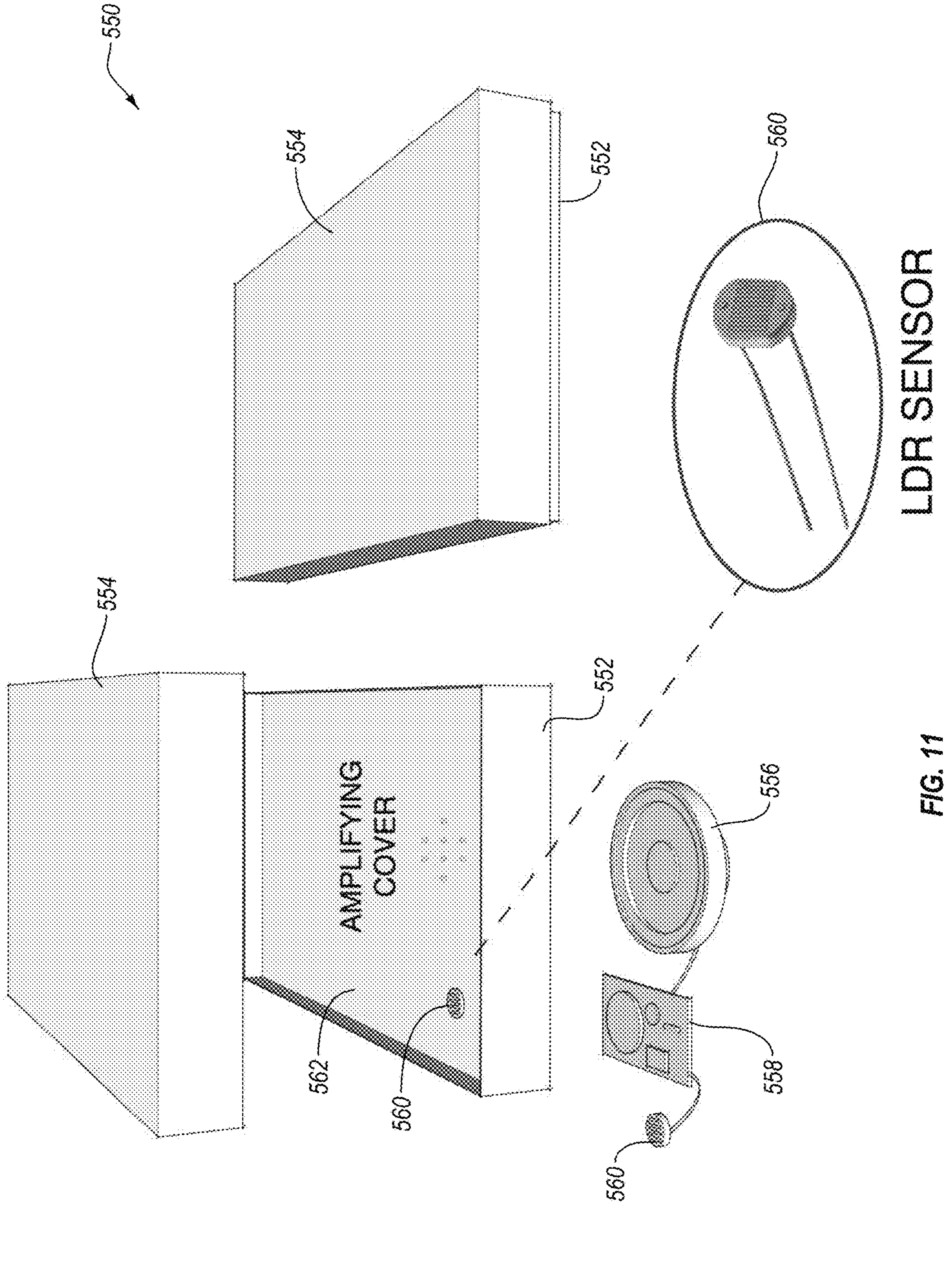
FIG. 11 discloses aspects of a presentation sound box having a configuration similar to that of FIG. 7 but employing a different type of switch.

Turning now to FIG. 11, details are provided concerning a sixth example combination of a trigger and a box. In particular, Example 6—Trigger B: LDR SENSOR+Box Construction B: Box with lid/base configuration. As shown in FIG. 11, a presentation media package, one example of which is a presentation sound box, is denoted generally at 550. As shown, the presentation media package 550 includes a base 552 configured to removably receive a lid 554. One or more speakers 556 are provided in the base 552, along with a media module 558, such as a sound module or any other media module configured to play back content such as digital content. A trigger device 560, which can be an LDR sensor (photo/light sensor) for example, is also provided that is operably connected to the media module 558 so that when the trigger device 560 is activated, such as by manipulation of the lid 554, the media module 558 will play back content. In this particular embodiment, the trigger device 560 is configured and arranged such that when the lid 554 is closed, little or no light reaches the trigger device 560 and, as a result, the circuit of the media module 558 remains open. As the lid 554 is removed, the trigger device 560 is exposed to light outside of the base 552 and the circuit is closed, enabling the media module 558 to play back content. As further indicated in FIG. 11, an amplifying cover 562 is provided and can be configured to receive the trigger device 560.

Figure 12:
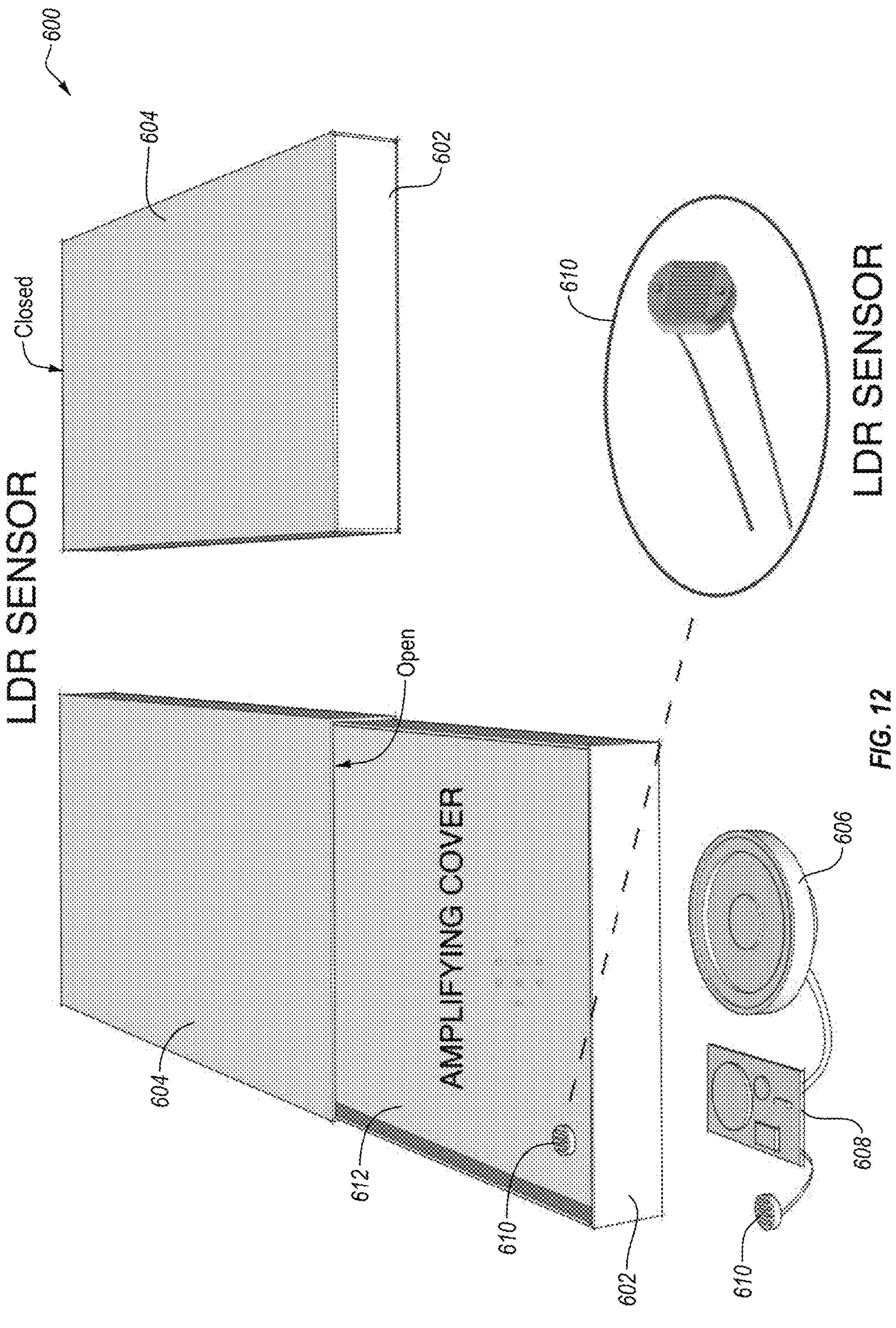
FIG. 12 discloses aspects of a presentation sound box having a configuration similar to that of FIG. 8 but employing a different type of switch.

With reference now to FIG. 12, details are provided concerning a seventh example combination of a trigger and a box. In particular, Example 7—Trigger B: LDR SENSOR+Box Construction C: Box with tray and sleeve configuration. As shown in FIG. 12, a presentation media package, one example of which is a presentation sound box, is denoted generally at 600. As shown, the presentation media package 600 a base 602 in the form of a tray that is configured to be removably received in a cover in the form of a sleeve 604 that is open at one end and closed at the other. One or more speakers 606 are provided in the base 602, along with a media module 608, such as a sound module or any other media module configured to play back content such as digital content. A trigger device 610, which can be an LDR sensor (photo/light sensor) for example, is also provided that is operably connected to the media module 608 so that when the trigger device 610 is activated, such as by retraction of the base 602 from the sleeve 604, the media module 608 will play back content. In this particular embodiment, the trigger device 610 is configured and arranged such that when the sleeve 604 is closed, little or no light reaches the trigger device 610 and, as a result, the circuit of the media module 608 remains open. As the sleeve 604 is retracted from the base 602 and/or vice versa, the trigger device 610 is exposed to light sourced from outside of the base 602 and the circuit is closed, enabling the media module 608 to play back content. As further indicated in FIG. 12, an amplifying cover 612 is provided and can be configured to receive the trigger device 610.

Figure 13:
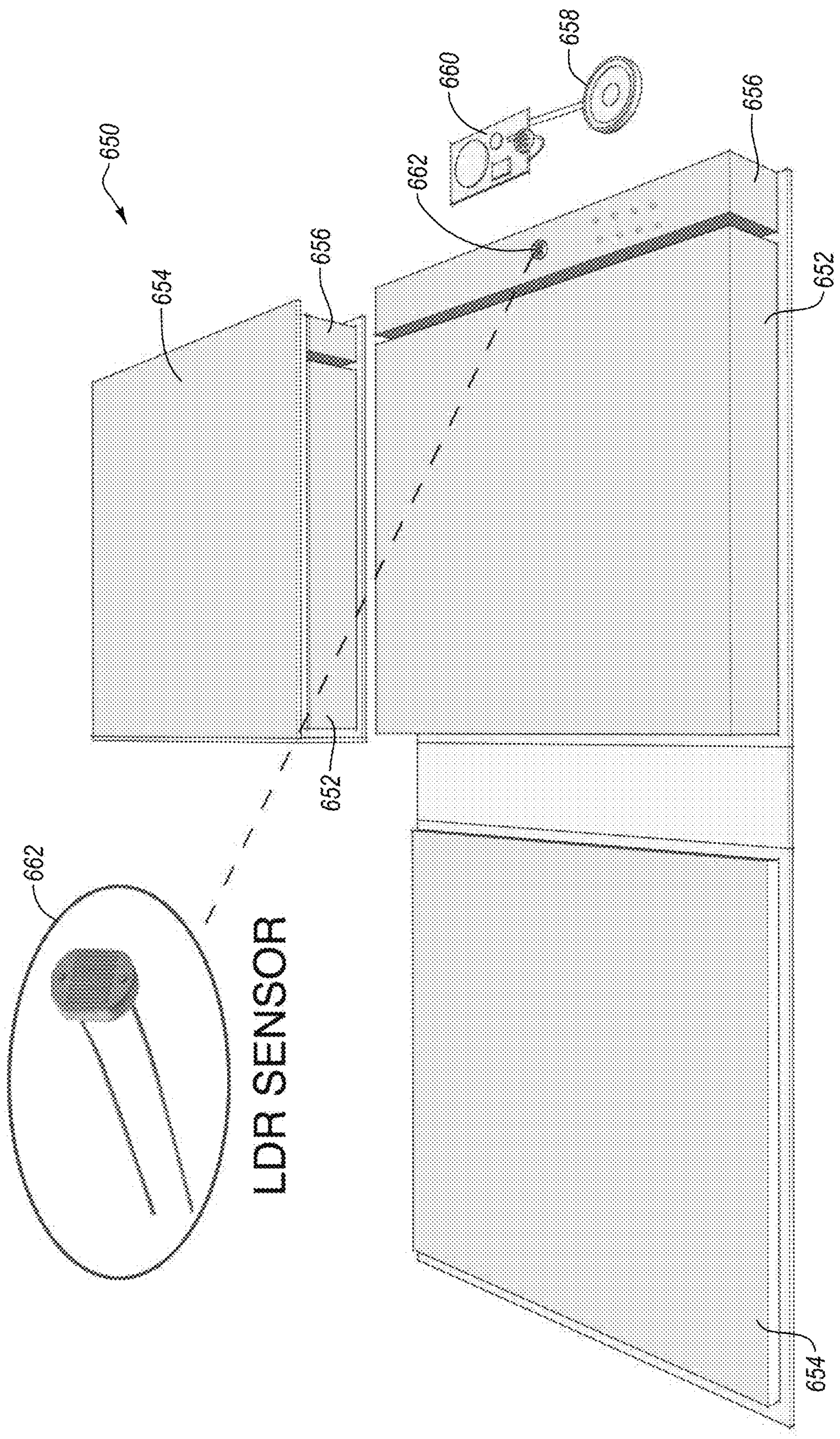
FIG. 13 discloses aspects of a presentation sound box having a configuration similar to that of FIG. 9 but employing a different type of switch.

Turning now to FIG. 13, details are provided concerning an eighth example combination of a trigger and a box. In particular, Example 8—Trigger B: LDR SENSOR+Box Construction D: book style configuration. As shown in FIG. 13, a presentation media package, one example of which is a presentation sound box, is denoted generally at 650. As shown, the presentation media package 650 includes a base 652 to which a cover 654 is attached, similar to the manner of a cover of a book, for example. The base 652 is sized and configured to hold one or more items. Spaced apart from the base 652, but still arranged to be covered by the cover 654, is a compartment 656. In some embodiments, the compartment 656 is part of the base 652 and, as such, is defined by a partition (not shown) within base 652. One or more speakers 658 are provided in the compartment 656, along with a media module 660, such as a sound module or any other media module configured to play back content such as digital content. A trigger device 662, which can be an LDR sensor (photo/light sensor) for example, is also provided that is operably connected to the media module 660 so that when the trigger device 662 is operated, such as by manipulation of the cover 654, the media module 660 will play back content. In this particular embodiment, the trigger device 662 is configured and arranged such that when the sleeve cover 654 is closed, little or no light reaches the trigger device 662 and, as a result, the circuit of the media module 660 remains open. As the cover 654 is opened and uncovers the trigger device 662, the trigger device 662 is exposed to light sourced from outside of the base 652 and the circuit is closed, enabling the media module 660 to play back content. As further indicated in FIG. 13, the compartment 656 can be configured to serve as an amplifying cover for the speaker 658.

Figure 14:
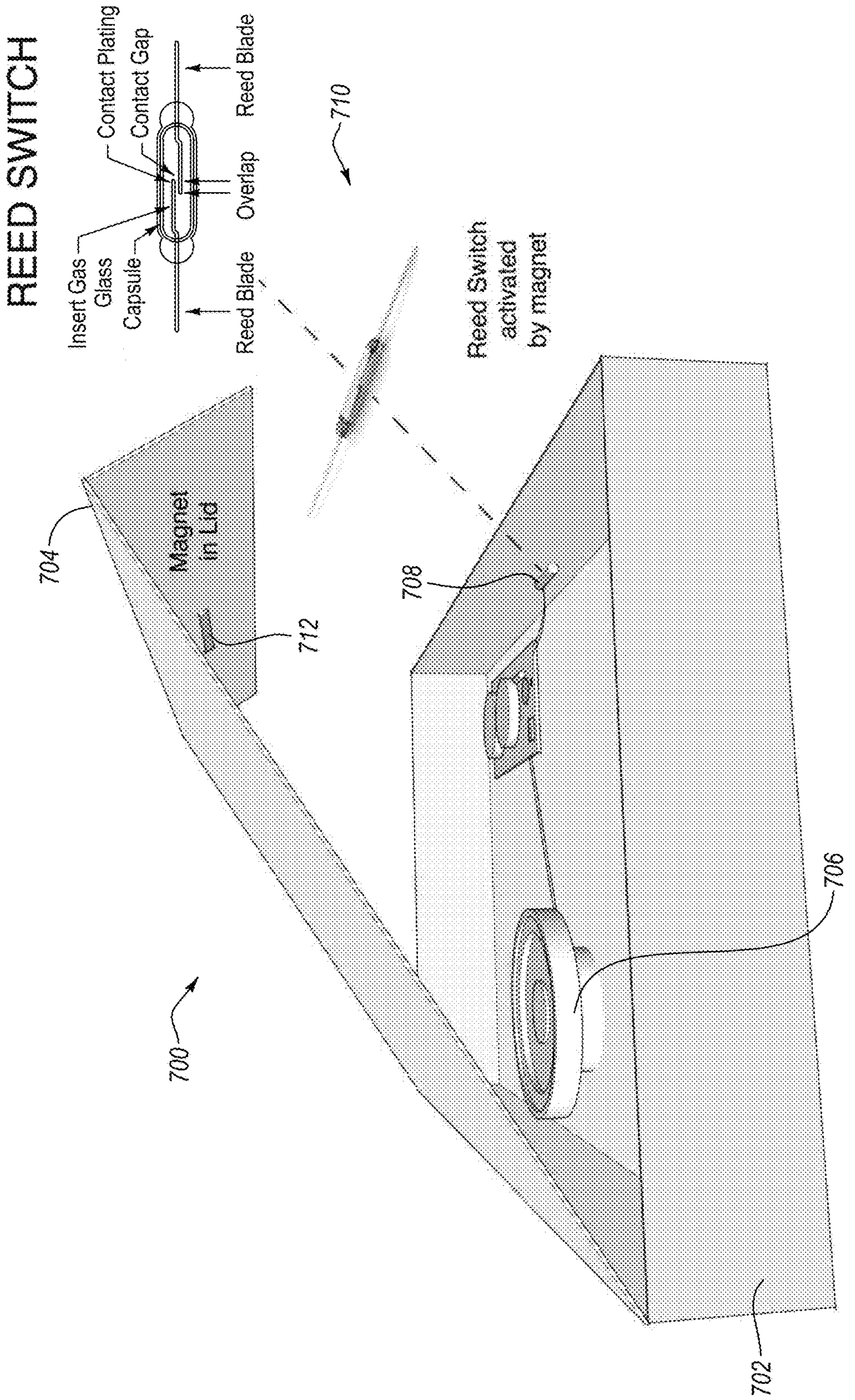
FIG. 14 discloses aspects of a presentation sound box having a configuration similar to that of FIG. 6 but employing a different type of switch.

Directing attention now to FIG. 14, details are provided concerning a ninth example combination of a trigger and a box. In particular, Example 9—Trigger C: Reed Switch+Box Construction A: box with one side hinged configuration. As shown in FIG. 14, a presentation media package, one example of which is a presentation sound box, is denoted generally at 700. As shown, the presentation media package 700 includes a base 702 to which a lid 704 is attached in a hinge arrangement. One or more speakers 706 are provided in the base 702, along with a media module 708, such as a sound module or any other media module configured to play back content such as digital content. A trigger device 710, which can be a normally closed (N.C.) reed switch that is maintained in an open position by one or more magnets for example, is also provided that is operably connected to the media module 708 so that when the trigger device 710 is activated, such as by manipulation of the lid 704, the media module 708 will play back content. In this particular embodiment, the trigger device 710 is configured and arranged such that as the lid 704 closes its flap over the base 702, a magnet 712 comes into proximity with the trigger device 710, opening the contacts of the reed switch and preventing current from flowing to the media module 708. When the lid 704 is lifted, the magnet 712 is moved away from the trigger device 710, thus allowing the contacts of the reed switch to close and allow current to flow to the media module 708. While not specifically illustrated in FIG. 14, an amplifying cover can be provided that covers the speaker 706 and media module 708.

Figure 15:
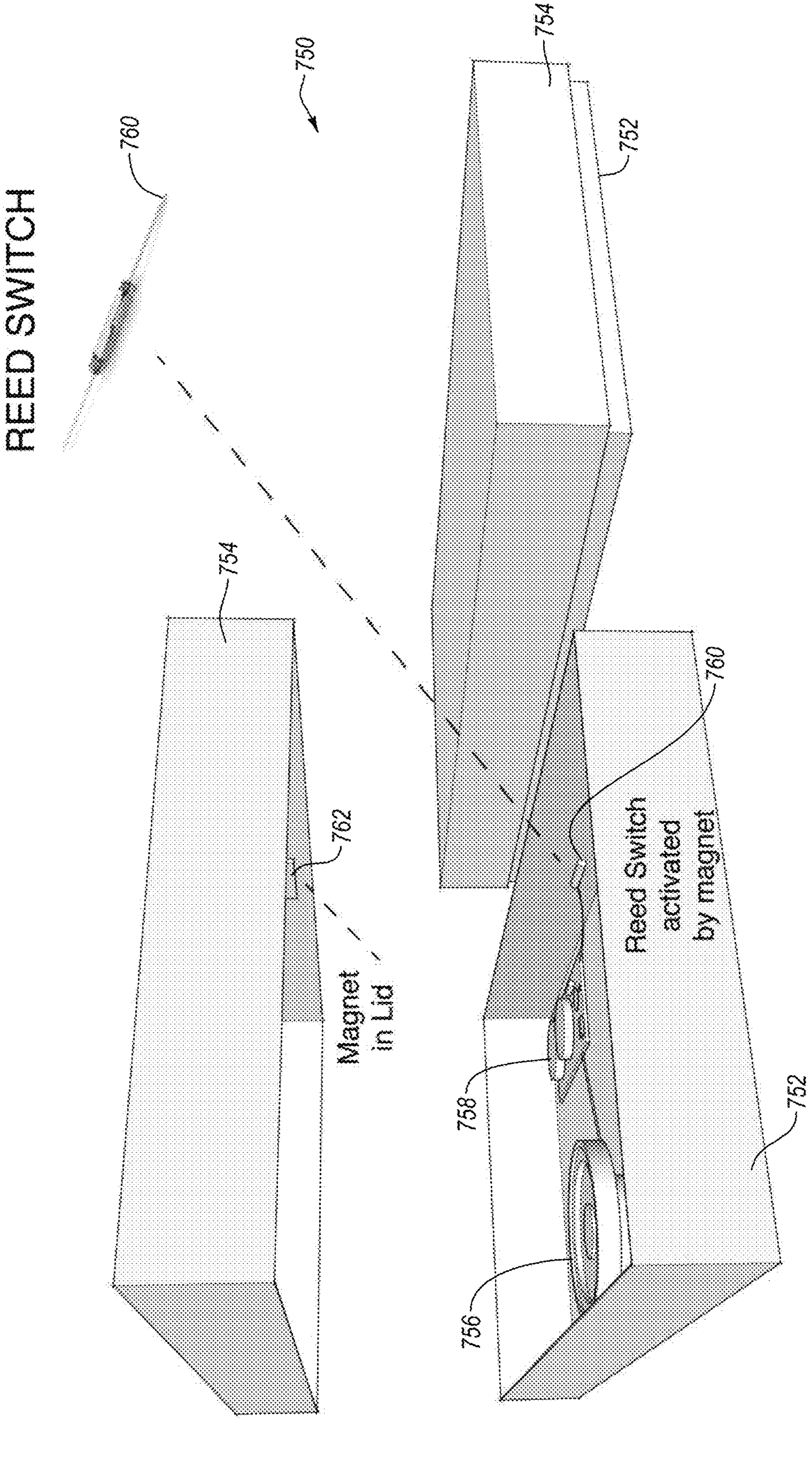
FIG. 15 discloses aspects of a presentation sound box having a configuration similar to that of FIG. 7 but employing a different type of switch.

Turning now to FIG. 15, details are provided concerning a tenth example combination of a trigger and a box. In particular, Example 10—Trigger C: Reed Switch+Box Construction B: Box with lid/base configuration. As shown in FIG. 15, a presentation media package, one example of which is a presentation sound box, is denoted generally at 750. As shown, the presentation media package 750 includes a base 752 configured to removably receive a lid 754. One or more speakers 756 are provided in the base 752, along with a media module 758, such as a sound module or any other media module configured to play back content such as digital content. A trigger device 760, which can be a normally closed (N.C.) reed switch that is maintained in an open position by one or more magnets or suitable circuitry for example, is also provided that is operably connected to the media module 758 so that when the trigger device 760 is activated, such as by manipulation of the lid 754, the media module 758 will play back content. In this particular embodiment, the trigger device 760 is configured and arranged such that as the lid 754 is placed over the base 752, a magnet 762 comes into proximity with the trigger device 760, opening the contacts of the reed switch and preventing current from flowing to the media module 758. When the lid 754 is lifted off the base 752, the magnet 762 is moved away from the trigger device 760, thus allowing the contacts of the reed switch to close and allow current to flow to the media module 758. While not specifically illustrated in FIG. 15, an amplifying cover can be provided that covers the speaker 756 and media module 758.

Figure 16:
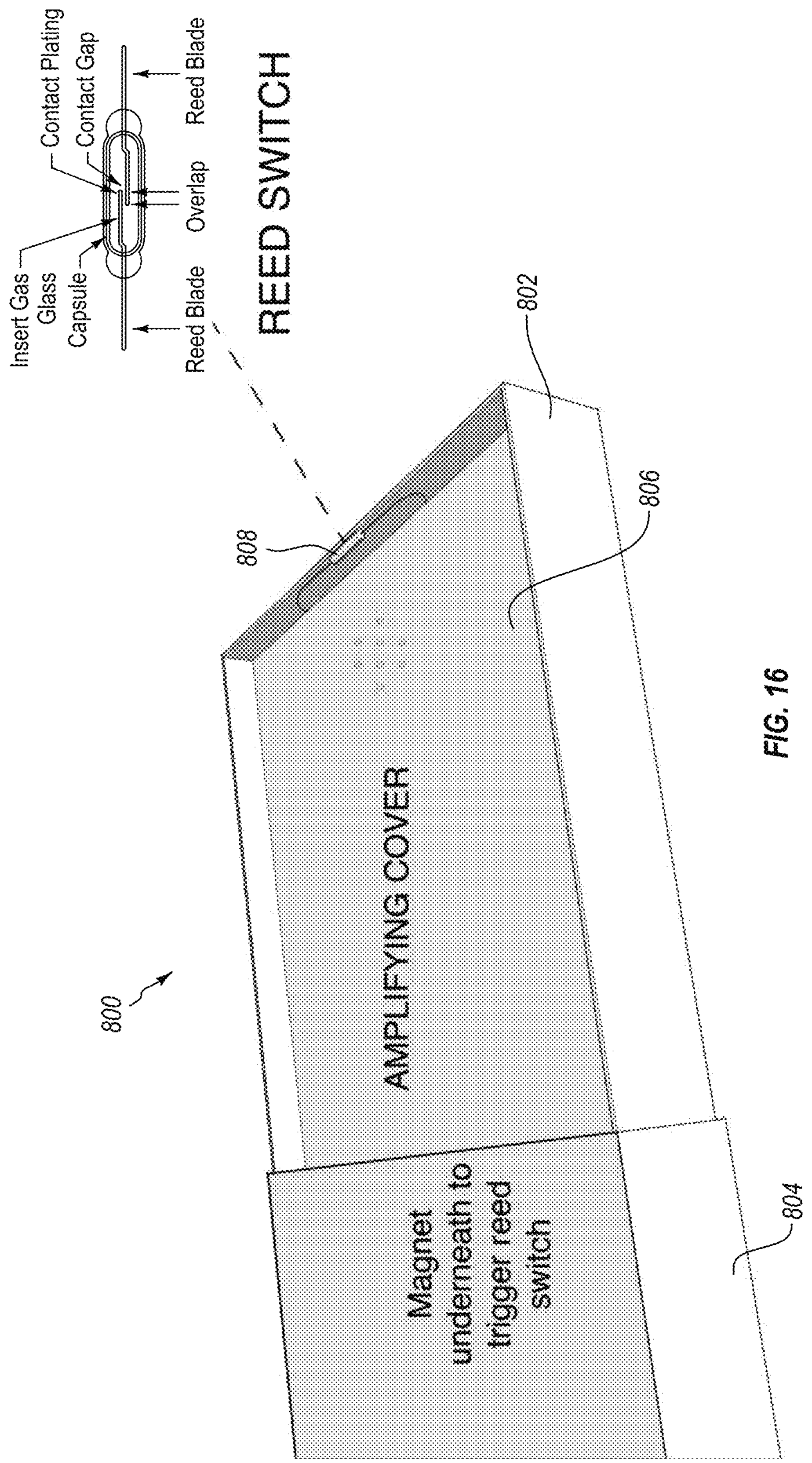
FIG. 16 discloses aspects of a presentation sound box having a configuration similar to that of FIG. 8 but employing a different type of switch.

With attention to FIG. 16, details are provided concerning an eleventh example combination of a trigger and a box. In particular, Example 11—Trigger C: Reed Switch+Box Construction C: Box with tray and sleeve configuration. As shown in FIG. 16, a presentation media package, one example of which is a presentation sound box, is denoted generally at 800. As shown, the presentation media package 800 includes a base 802 in the form of a tray configured to be removably received in a cover 804 which may be in the form of a sleeve. One or more speakers (not shown) and a media module (not shown) configured to play back content such as digital content are provided in the base 802. An amplifying cover 806 may be provided over the speaker and media module. A trigger device 808, which can be a normally closed (N.C.) reed switch that is maintained in an open position by one or more magnets or circuitry for example, is also provided that is operably connected to the media module so that when the trigger device 808 is activated, such as by manipulation of the cover 804, the media module will play back content. In this particular embodiment, the trigger device 808 is configured and arranged such that as the cover 804 is extended over the base 802, a magnet (not shown) concealed on the underside of the cover 804 comes into proximity with the trigger device 808, opening the contacts of the reed switch and preventing current from flowing to the media module. When the cover 804 is retracted from the base 802, the magnet is moved away from the trigger device 802, thus allowing the contacts of the reed switch to close and allow current to flow to the media module.

Figure 17:
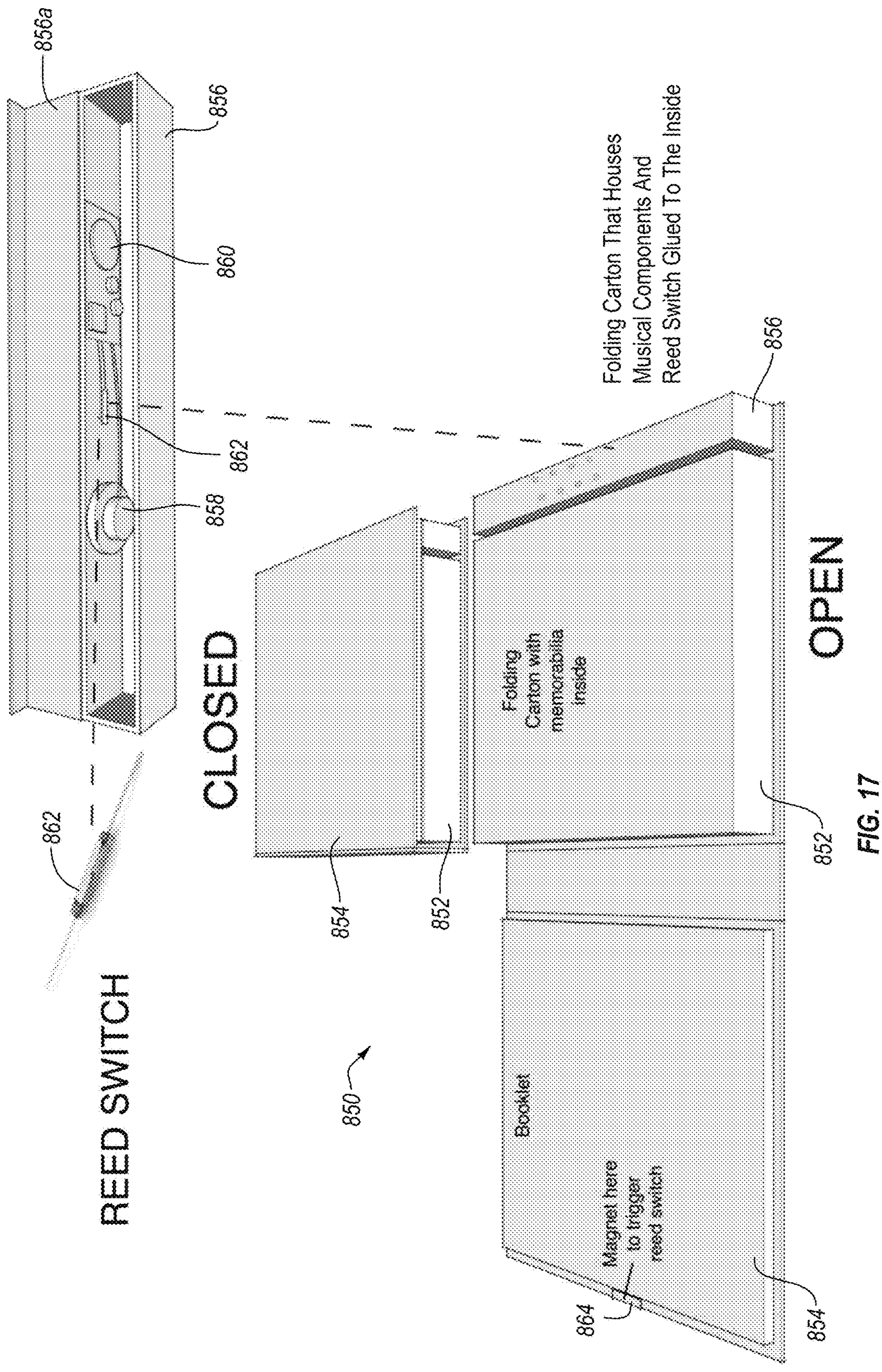
FIG. 17 discloses aspects of a presentation sound box having a configuration similar to that of FIG. 6 but employing a different type of switch.

Directing attention next to FIG. 17, details are provided concerning a twelfth example combination of a trigger and a box. In particular, Example 12—Trigger C: Reed Switch+Box Construction D: book style configuration. As shown in FIG. 17, a presentation media package, one example of which is a presentation sound box, is denoted generally at 850. As shown, the presentation media package 850 includes a base 852 to which a cover 854 is attached, similar to the manner of a cover of a book for example. The base 852 is sized and configured to hold one or more items. Spaced apart from the base 852, but still arranged to be covered by the cover 854 is a compartment 856. In some embodiments, the compartment 856 is part of the base 852 and, as such, is defined by a partition (not shown) within base 852. The compartment 856 can include a lid 856*a* that permits access to the interior of the compartment 856. One or more speakers 858 are provided in the compartment 856, along with a media module 860, such as a sound module or any other media module configured to play back content such as digital content. In the embodiment of FIG. 17, the compartment 856, which houses the speaker(s) 858, can implement an amplifying function such as that provided by the amplifying covers disclosed herein. A trigger device 862, which can be a normally closed (N.C.) reed switch for example, is also provided that is operably connected to the media module 860 so that when the trigger device 862 is operated, such as by manipulation of the cover 854, the media module 860 will play back content. In this particular embodiment, the trigger device 862 is configured and arranged such that the trigger device 862 can be acted upon by a magnet 864 in the cover 854 as the cover 854 is closed on the base 852. More specifically, the trigger device 862 is configured and arranged such that as the cover 854 comes into contact with the base 852, the magnet 864 comes into proximity with the trigger device 862, opening the contacts of the reed switch and preventing current from flowing to the media module 860. When the cover 854 is moved away from the base 852, the magnet 864 is moved away from the trigger device 862, thus allowing the contacts of the reed switch to close and allow current to flow to the media module 860.

Figure 18:
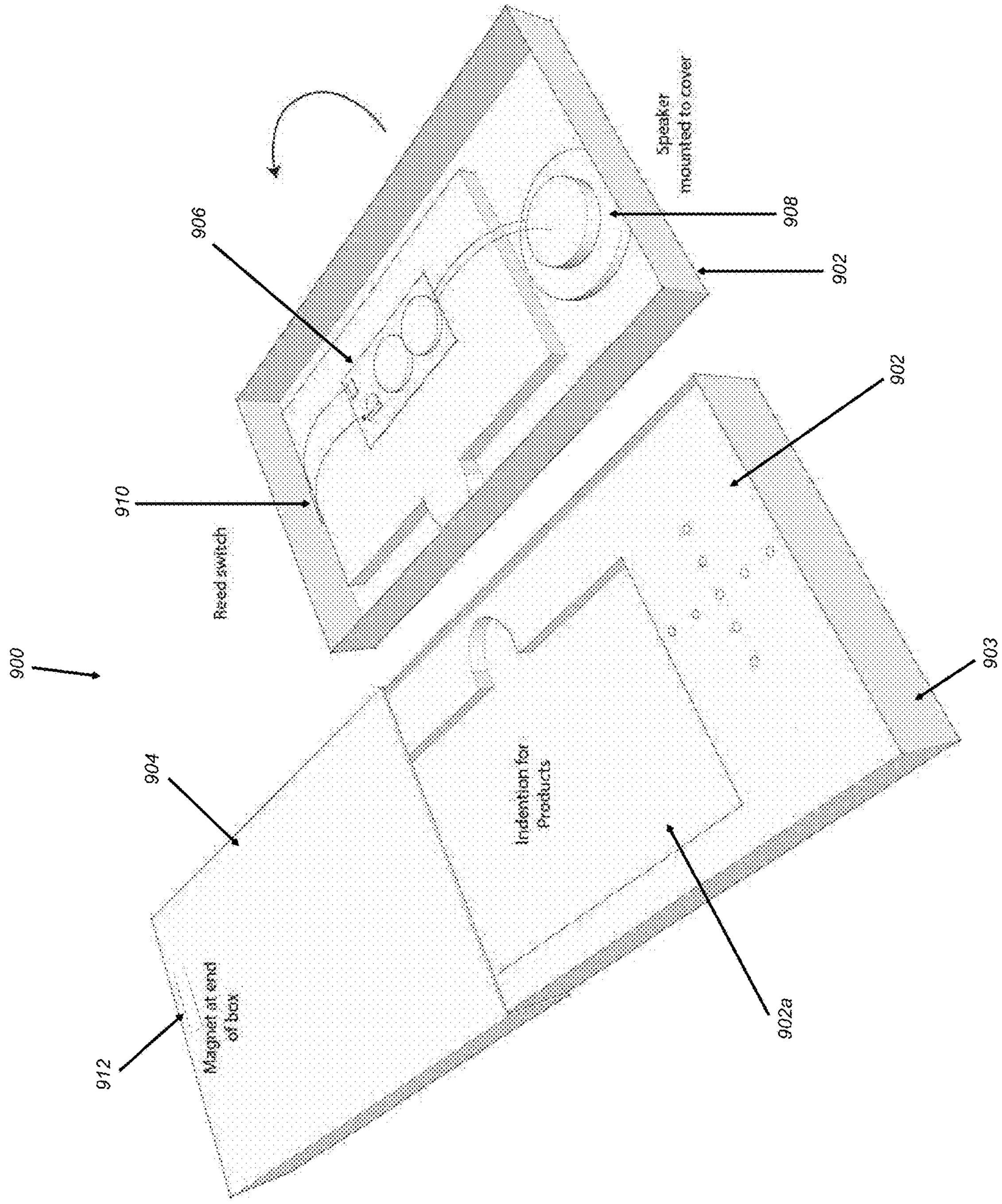
FIG. 18 discloses aspects of a presentation sound box having a tray and sleeve configuration and including an amplifying cover to which various components are mounted.

Turning now to FIG. 18, details are provided concerning a thirteenth example combination of a trigger and a box. In particular, Example 13—Trigger C: Reed Switch+Box Construction C: Box with tray and sleeve configuration. As shown in FIG. 18, a presentation media package, one example of which is a presentation sound box, is denoted generally at 900. As shown, the presentation media package 900 includes an amplifying cover 902 configured to be placed in a box 903 that is in the form of a tray configured to be removably received in a cover 904 which may be in the form of a sleeve. A media module 906, speaker 908, and trigger device 910, which can be a normally closed (N.C.) reed switch that is maintained in an open position by one or more magnets or suitable circuitry for example, are mounted to the amplifying cover 902, and the amplifying cover 902 defines one or more recesses 902*a* sized, configured and oriented to receive a product, gift or other item(s). The trigger device 910 is operably connected to the media module 906 so that when the trigger device 910 is activated, such as by manipulation of the cover 904 and/or amplifying cover 902, the media module 906 will play back content. In this particular embodiment, the trigger device 910 is configured and arranged such that as the cover 904 is extended over the amplifying cover 902, a magnet 912 concealed on the underside of the cover 904 comes into proximity with the trigger device 910, opening the contacts of the reed switch and preventing current from flowing to the media module 906. When the cover 904 is retracted from the amplifying cover 902, the magnet 912 is moved away from the trigger device 910, thus allowing the contacts of the reed switch to close and allow current to flow to the media module 906.

Figure 19:
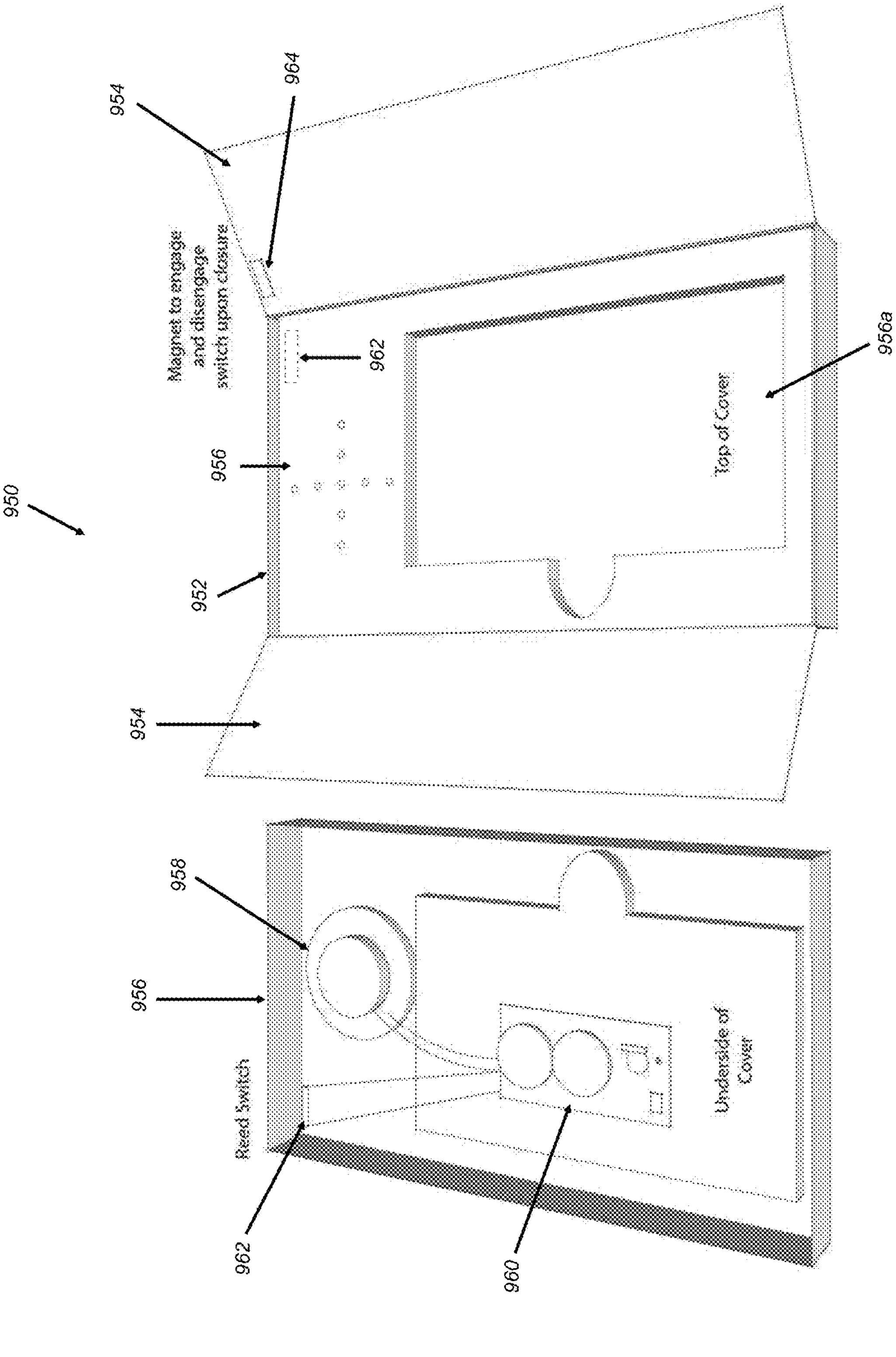
FIG. 19 discloses aspects of an embodiment similar to that disclosed in FIG. 18, but with a hinged cover in a gate configuration.

Directing attention now to FIG. 19, details are provided concerning a fourteenth example combination of a trigger and a box. In particular, Example 14—Trigger C: Reed Switch+Box Construction A: box with one or both sides hinged. As shown in FIG. 19, a presentation media package, one example of which is a presentation sound box, is denoted generally at 950. As shown, the presentation media package 950 includes a base 952 to which two lid portions 954, in the style of a gate, are attached in a hinge arrangement. An amplifying cover 956 is also provided that is configured to be positioned within the base 952, and the amplifying cover 956 defines one or more recesses 956*a* sized, configured and oriented to receive a product, gift or other item(s). One or more speakers 958 are mounted to the amplifying cover 956, along with a media module 960, such as a sound module or any other media module configured to play back content such as digital content. A trigger device 962, which can be a normally closed (N.C.) reed switch that is maintained in the open position by one or more magnets 964 for example, is also provided that is mounted to the amplifying cover 956 and operably connected to the media module 960 so that when the trigger device 962 is activated, such as by manipulation of a lid portion 954, the media module 960 will play back content. The trigger device 962 is configured and arranged such that as the lid portion 954 closes over the base 952, the magnet 964 comes into proximity with the trigger device 962, opening the contacts of the reed switch and preventing current from flowing to the media module 960. When the lid portion 954 carrying the magnet 964 is lifted, the magnet 964 is moved away from the trigger device 962, thus allowing the contacts of the reed switch to close and allow current to flow to the media module 960.

Figure 20:
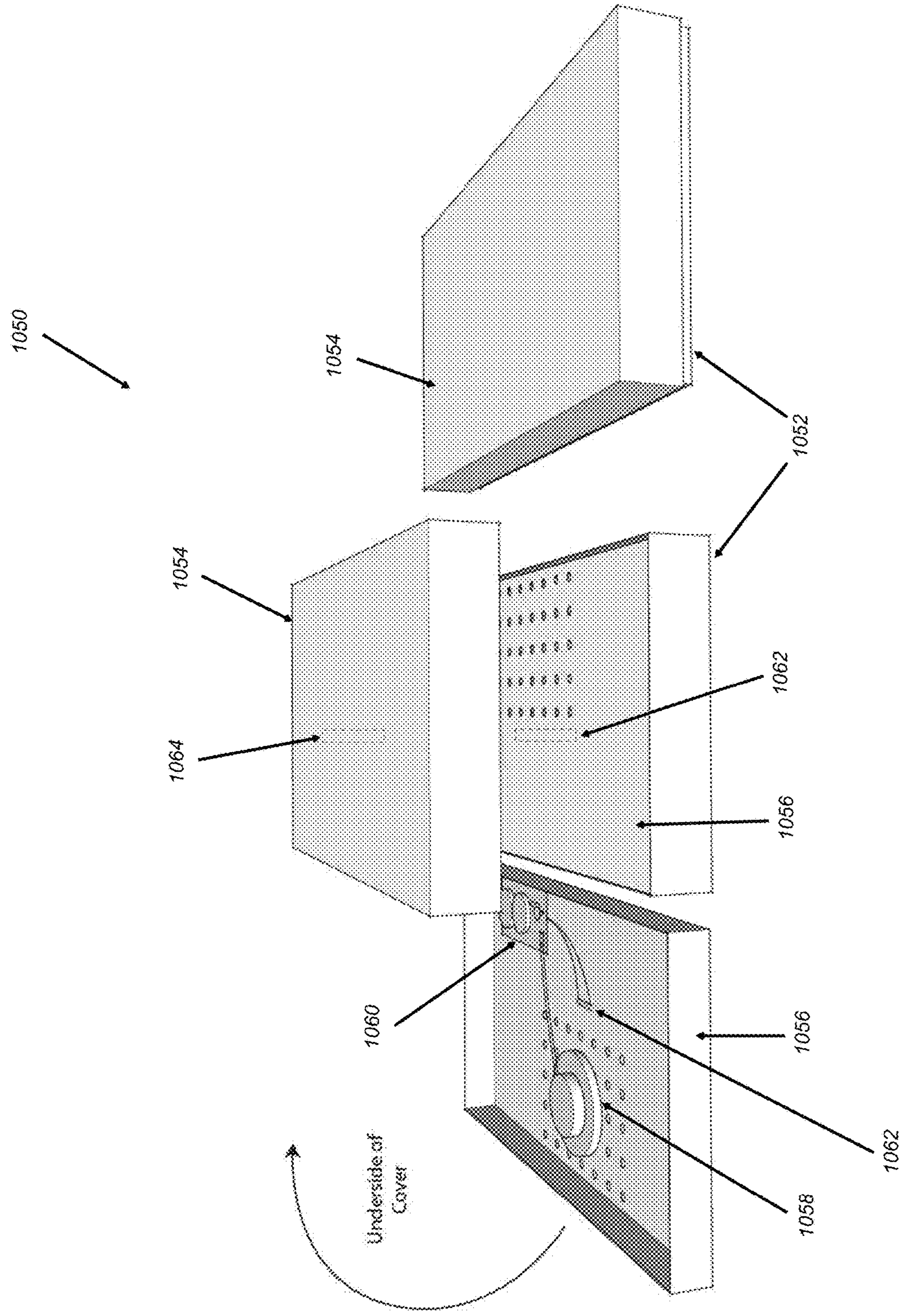
FIG. 20 discloses aspects of a presentation sound box having a lid and base configuration and including an amplifying cover to which various components are mounted.

Turning now to FIG. 20, details are provided concerning a fifteenth example combination of a trigger and a box. In particular, Example 15—Trigger C: Reed Switch+Box Construction B: Box with lid/base configuration. As shown in FIG. 20, a presentation media package, one example of which is a presentation sound box, is denoted generally at 1050. As shown, the presentation media package 1050 includes a base 1052 configured to removably receive a lid 1054. As well, an amplifying cover 1056 is provided that is configured to be received within the base 1052. Mounted to the underside of the amplifying cover 1056 are one or more speakers 1058, a media module 1060, such as a sound module or any other media module configured to play back content such as digital content, and a trigger device 1062, which can be a normally closed (N.C.) reed switch that is maintained in an open position by one or more magnets or suitable circuitry for example, is also provided that is operably connected to the media module 1060 so that when the trigger device 1062 is activated, such as by manipulation of the lid 1054, the media module 1060 will play back content. In this particular embodiment, the trigger device 1062 is configured and arranged such that as the lid 1054 is placed over the base 1052, a magnet 1064 attached to the underside of the lid 1054 comes into proximity with the trigger device 1062, opening the contacts of the reed switch and preventing current from flowing to the media module 1060. When the lid 1054 is lifted off the base 1052, the magnet 1064 is moved away from the trigger device 1062, thus allowing the contacts of the reed switch to close and allow current to flow to the media module 1060.

Figure 21:
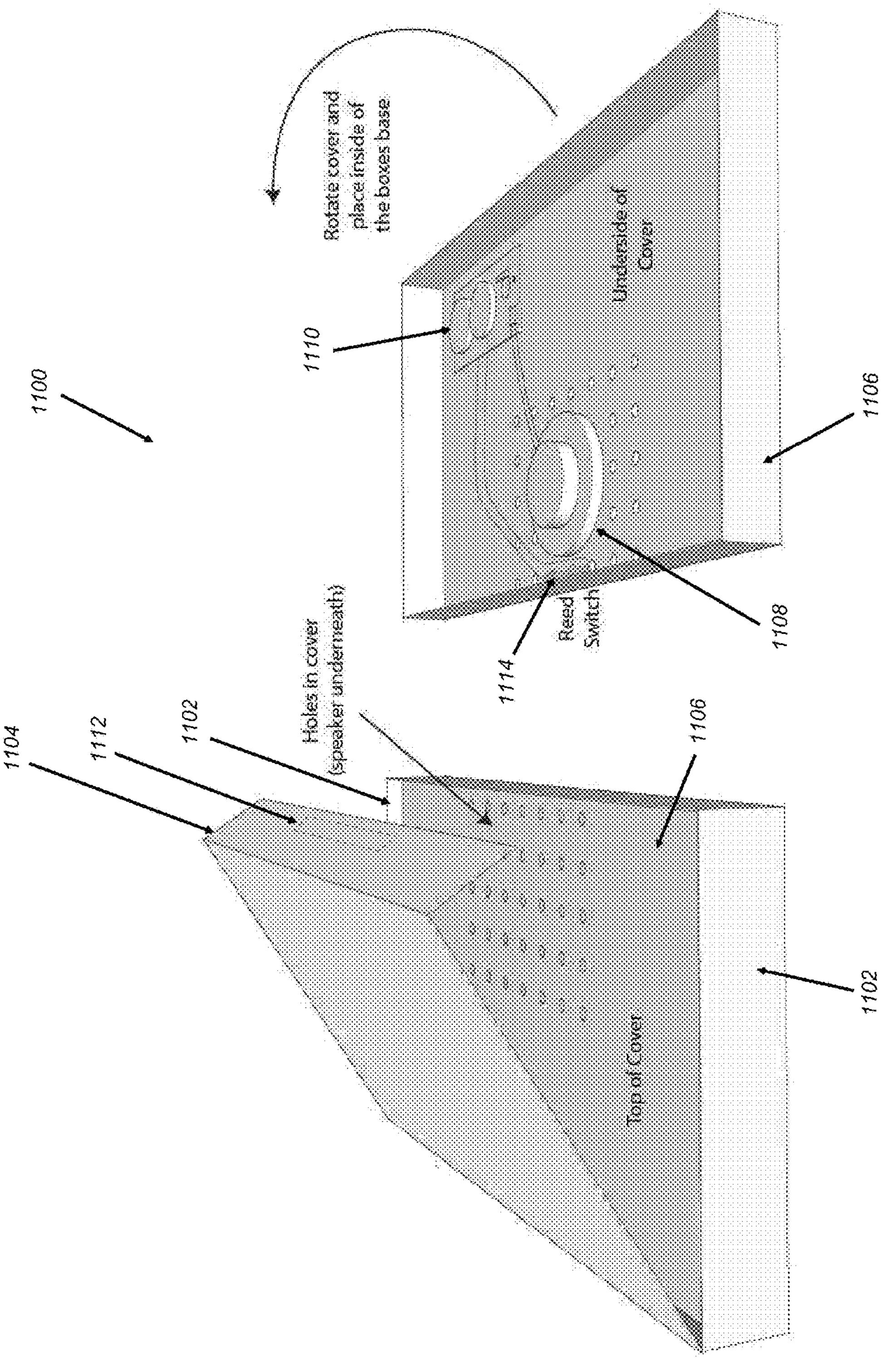
FIG. 21 discloses aspects of a presentation sound box having a base with hinged lid configuration and including an amplifying cover to which various components are mounted.

Directing attention finally to FIG. 21, details are provided concerning a sixteenth example combination of a trigger and a box. In particular, Example 16—Trigger C: Reed Switch+Box Construction A: box with one side hinged configuration. As shown in FIG. 21, a presentation media package, one example of which is a presentation sound box, is denoted generally at 1100. As shown, the presentation media package 1100 includes a base 1102 to which a lid 1104 is attached in a hinge arrangement. As well, an amplifying cover 1106 is provided that is configured to be positioned in the base 1102. Attached to the amplifying cover 1106 are one or more speakers 1108, along with a media module 1110, such as a sound module or any other media module configured to play back content such as digital content. A trigger device (not shown), which can be a normally closed (N.C.) reed switch that is maintained in an open position by one or more magnets for example, is also provided that is positioned on the underside of the lid 1104 and is operably connected to the media module 1110 so that when the trigger device is activated, such as by manipulation of the lid 1104, the media module 1110 will play back content. In this particular embodiment, as the lid 1104 closes over the base 1102, a magnet 1112 on the inside of the lid 1104 flap comes into proximity with a trigger device 1114 that is mounted to the amplifying cover 1106, thereby opening the contacts of the reed switch and preventing current from flowing to the media module 1110. When the lid 1104 is lifted, the magnet 1112 is moved away from the trigger device, thus allowing the contacts of the reed switch to close and allow current to flow to the media module 1110.

E. Example Box/Package Materials

The boxes and packages disclosed herein can be made of any suitable materials, in any combination. Accordingly, example materials, any one or more of which can be used in the construction of a box, package or any portion thereof, include, but are not limited to, paper, cardboard, plastic, rubber, metal, wood and other organic materials, ceramic, composite materials, glass, and minerals.

F. Trigger Functionality

As noted herein, a variety of mechanisms can be employed to control the production of sound by the sound module. In at least some instances, such mechanisms take the form of light activated sensors. In other instances, motion-activated sensors could be used such that, when motion within the box is detected, such as the motion of a hand of a user for example, the sensor is activated and enables the media module to be energized to produce sound. As will be apparent from these examples, these and the other triggers disclosed herein are examples of structural implementations of a means for activating a media module, and any other structure(s) of comparable functionality can alternatively be employed.

G. Further Alternative Embodiments

In view of the disclosure of the application, various further embodiments will be apparent. Examples of such additional embodiments are set forth below.

Example Embodiment 1

A presentation sound box, comprising: a box including a first box portion and a second box portion that is movable relative to the first box portion; a sound module connected to one or both of the first box portion and the second box portion, and the sound module including: a speaker; a processor; and a memory accessible by the processor; a power source operable to drive the speaker and processor; a trigger device including an actuator that is operably connected to the power source; and an amplifying cover configured and arranged to at least partly enclose the speaker.

Example Embodiment 2

The presentation sound box of Embodiment 1, wherein the actuator is a light-sensitive switch.

Example Embodiment 3

The presentation sound box of Embodiment 1, wherein the actuator is responsive to light incident on the actuator as a result of the movement of one box portion relative to the other box portion.

Example Embodiment 4

The presentation sound box of Embodiment 1, wherein the memory stores instructions executable by the processor to generate sound when the trigger device has been activated.

Example Embodiment 5

The presentation sound box of Embodiment 1, wherein the processor is disconnected from the power supply if the actuator of the trigger device is in a first position.

Example Embodiment 6

The presentation sound box of Embodiment 1, wherein the actuator of the trigger device is in a first position when the first and second box portions are arranged relative to each other so that the box is closed, and the actuator of the trigger device is in a second position when the first and second box portions are arranged relative to each other so that the box is open.

Example Embodiment 7

The presentation sound box of Embodiment 1, wherein the memory is a write-once-read-many (WORM) memory.

Example Embodiment 8

The presentation sound box of Embodiment 1, wherein the memory is a write-many-read-many (WMRM) memory.

Example Embodiment 9

The presentation sound box of Embodiment 1, wherein the sound module further comprises a wireless receiver configured to communicate with one or both of the memory and the processor, and with an external wireless transmitter.

Example Embodiment 10

The presentation sound box of Embodiment 1, wherein the actuator comprises a reed switch that includes first and second magnets, each of the magnets being disposed on a respective portion of the box.

Example Embodiment 11

The presentation sound box of Embodiment 1, wherein: the actuator is selected from the group comprising: TACT switch; LDR sensor; and, reed switch; and a construction of the box is selected from the group comprising: box with one side hinged; lid and base; tray and sleeve; and, book spine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A presentation media package, comprising:

a base, and a cover configured to cooperate with the base to define an interior space, wherein the position of the cover relative to the base is changeable;

a media module and a speaker disposed in the interior space and electrically connected to each other, and the media module including:

a processor;

a memory accessible by the processor; and a power source operable to drive the speaker and processor;

a trigger device that is operably connected to the power source; and an amplifying cover positioned within the base, the amplifying cover including a recessed portion that defines a recess in the amplifying cover, the recess extending below an upper surface of the amplifying cover, and the amplifying cover having an underside through which a plurality of holes extend, an underside of the recessed portion cooperating with sidewalls of the amplifying cover and a bottom of the base to at least partly define a chamber with which the plurality of holes communicates, and the speaker is located within the chamber proximate the underside of the recessed portion.

2. The presentation media package as recited in claim 1, wherein the trigger device is operable by a manipulation of the cover.

3. The presentation media package as recited in claim 1, wherein the memory is programmable with content by a user.

4. The presentation media package as recited in claim 1, wherein the memory includes digital content comprising any one or more of audio, video, photographs, and graphical material.

5. The presentation media package as recited in claim 1, wherein the trigger device is operable to cause playback of content stored in the memory.

6. The presentation media package as recited in claim 1, wherein the trigger device is operable to halt playback of content stored in the memory.

7. The presentation media package as recited in claim 1, wherein the media module is configured for wireless communication with a content source.

8. The presentation media package as recited in claim 1, wherein the trigger device is one of a TACT switch, an LDR sensor, or a reed switch.

9. The presentation media package as recited in claim 1, wherein the base and cover are configured in an arrangement that is one of a box with one side hinged, a lid and base, a tray and sleeve, or a book spine and cover.

10. A presentation sound box, comprising:

a box including a first box portion and a second box portion that is movable relative to the first box portion;

a sound module connected to one or both of the first box portion and the second box portion, and the sound module including:

a speaker;

a processor; and a memory accessible by the processor, the memory having pre-programmed content;

a power source operable to drive the speaker and processor;

a trigger device comprising a reed switch and magnet, and the trigger device is operably connected to the power source, wherein the trigger device is operable to enable playback of the pre-programmed content when one of the box portions is moved relative to the other box portion; and an amplifying cover made of a moldable material and positioned within the first box portion, the amplifying cover including a recessed portion that defines a recess in the amplifying cover, the recess extending below an upper surface of the amplifying cover, and the recessed portion having a bottom through which a plurality of holes extends, an underside of the recessed portion cooperating with sidewalls of the amplifying cover and a bottom of the first box portion to at least partly define a chamber with which the plurality of holes communicates, and the speaker is located within the chamber proximate the underside of the recessed portion.

11. The presentation sound box as recited in claim 10, wherein the memory stores instructions executable by the processor to generate sound when the trigger device has been activated.

12. The presentation sound box as recited in claim 10, wherein the processor is disconnected from the power supply if an actuator of the trigger device is in a first state.

13. The presentation sound box as recited in claim 10, wherein an actuator of the trigger device is in a first state when the first and second box portions are arranged relative to each other so that the box is closed, and the actuator of the trigger device is in a second state when the first and second box portions are arranged relative to each other so that the box is open.

14. The presentation sound box as recited in claim 10, wherein the memory is a write-once-read-many (WORM) memory.

15. The presentation sound box as recited in claim 10, wherein the memory is a write-many-read-many (WMRM) memory.

16. The presentation sound box as recited in claim 10, wherein the sound module further comprises a wireless receiver configured to communicate with one or both of the memory and the processor, and with an external wireless transmitter.

17. The presentation sound box as recited in claim 10, wherein the first box portion and the second box portion are configured in an arrangement that is one of a box with one side hinged, a lid and base, a tray and sleeve or, a book spine and cover.

18. The presentation sound box as recited in claim 1, wherein the amplifying cover is made of one of foam, rubber, plastic, paper, cardboard, paperboard, paper Mache, or any combination of these.

19. The presentation sound box as recited in claim 1, wherein the amplifying cover further includes a shelf extending along part of a perimeter of the recessed portion.

* * * * *